(12) United States Patent
Embutsu et al.

(10) Patent No.: US 12,032,269 B2
(45) Date of Patent: Jul. 9, 2024

(54) WAVELENGTH CONVERSION APPARATUS

(71) Applicant: Nippon Telegraph and Telephone Corporation, Tokyo (JP)

(72) Inventors: Koji Embutsu, Musashino (JP);
Osamu Tadanaga, Musashino (JP);
Takeshi Umeki, Musashino (JP);
Asuka Inoue, Musashino (JP); Ryoichi Kasahara, Musashino (JP); Takahiro Kashiwazaki, Musashino (JP);
Nobutatsu Koshobu, Musashino (JP);
Takushi Kazama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/919,670

(22) PCT Filed: Apr. 21, 2020

(86) PCT No.: PCT/JP2020/017240
§ 371 (c)(1),
(2) Date: Oct. 18, 2022

(87) PCT Pub. No.: WO2021/214883
PCT Pub. Date: Oct. 28, 2021

(65) Prior Publication Data
US 2023/0152665 A1 May 18, 2023

(51) Int. Cl.
*G02F 1/35* (2006.01)
*G02F 1/383* (2006.01)

(52) U.S. Cl.
CPC ............ *G02F 1/3534* (2013.01); *G02F 1/383* (2013.01)

(58) Field of Classification Search
CPC ............................... G02F 1/3534; G02F 1/383
See application file for complete search history.

(56) References Cited

U.S. PATENT DOCUMENTS

| | | | |
|---|---|---|---|
| 2008/0316590 A1 | 12/2008 | Mizuuchi et al. | |
| 2009/0040596 A1* | 2/2009 | Mizuuchi | G02F 1/3501 359/328 |
| 2023/0152665 A1* | 5/2023 | Embutsu | G02F 1/3534 359/326 |

FOREIGN PATENT DOCUMENTS

| | | |
|---|---|---|
| JP | 2009-025811 A | 2/2009 |
| JP | 2019-105796 A | 6/2019 |

OTHER PUBLICATIONS

Takeshi Umeki, et al., *Phase Sensitive Degenerate Parametric Amplification Using Directly-Bonded PPLN Ridge Waveguides*, Mar. 28, 2011, vol. 19, No. 7/Optics Express, pp. 6326-6332.

(Continued)

*Primary Examiner* — Rhonda S Peace
(74) *Attorney, Agent, or Firm* — Workman Nydegger

(57) ABSTRACT

In a wavelength conversion apparatus, reflection suppressors are provided on surfaces of optical elements indicating lenses, dichroic mirrors, and sealing windows excluding a wavelength conversion element in the apparatus between optical fibers F1 and F2 on the input side and optical fibers F3 and F4 on the output side, and on end surfaces of the optical fibers F3 and F4 on the output side. With this, even when light having a wavelength of a sum frequency component of signal light and excitation light is generated at the operation time of wavelength conversion of the wavelength conversion element, because the reflection suppressors suppress the reflection of unwanted light of the wavelength band, the unwanted light is unlikely to return to the wave- (Continued)

length conversion element and it is also possible to suppress a situation in which the unwanted light is mixed into the optical fibers F3 and F4.

6 Claims, 13 Drawing Sheets

(56) References Cited

OTHER PUBLICATIONS

T. Umeki, et al., *First Demonstration of High-Order QAM Signal Amplification In PPLN-Based Phase Sensitive Amplifier,* Feb. 10, 2014, vol. 22, No. 3/Optics Express pp. 2473-2482.

* cited by examiner

WAVELENGTH CONVERSION APPARATUS

TECHNICAL FIELD

The present invention relates to a wavelength conversion apparatus in which used is a second-order nonlinear optical element that stabilizes optical characteristics during wavelength conversion operation.

BACKGROUND ART

Conventionally wavelength conversion techniques have been applied in various fields such as optical signal wavelength conversion in optical communication, optical processing, medical treatment, biotechnology and the like. The wavelength range of light to be subjected to wavelength conversion extends from an ultraviolet range to a visible light range, an infrared range, and a terahertz range, that is, extends even to the wavelength range that cannot be directly output by a semiconductor laser.

The wavelength conversion techniques are also used in applications where sufficient high power is not obtained by semiconductor lasers, as wavelength ranges. In optical communication systems as well, the wavelength conversion techniques are used, for example, in wavelength conversion operations using difference frequency generation to be described below, wavelength conversion apparatuses configured to perform amplification operations utilizing parametric effects or the like.

Focusing on materials used for wavelength conversion, a periodic polarization inversion optical waveguide employing lithium niobate ($LiNbO_3$), which is a second-order nonlinear material and has a large nonlinear constant, is widely used in a commercially available light source due to its high wavelength conversion efficiency. In a second-order nonlinear optical effect, a wavelength conversion mechanism is utilized that generates a new wavelength $\lambda 3$ by inputting light having a wavelength $\lambda 1$ and light having a wavelength of $\lambda 2$ into a second-order nonlinear medium.

Several wavelength conversion schemes applied in the wavelength conversion mechanism are known, for example, a wavelength conversion represented by a relational expression 1 of $1/\lambda 3 = 1/\lambda 1 + 1/\lambda 2$ is referred to as sum frequency generation. Further, a wavelength conversion satisfying a relational expression 2 of $\lambda 3 = \lambda 1/2$, which is obtained by modifying the relational expression 1 with $\lambda 1 = \lambda 2$, is referred to as second harmonic generation (SHG). Furthermore, a wavelength conversion satisfying a relational expression 3 of $1/\lambda 3 = 1/\lambda 1 - 1/\lambda 2$ is referred to as difference frequency generation. The wavelengths $\lambda 1$, $\lambda 2$, and $\lambda 3$ used at the time of difference frequency generation according to the relational expression 3 are referred to as excitation light, signal light, and idler light, respectively.

It is also possible to constitute an optical parametric oscillator in which a nonlinear medium is set in a resonator and only the wavelength $\lambda 1$ is input into the resonator so as to generate the wavelength $\lambda 2$ and wavelength $\lambda 3$ satisfying the relational expression 3. In recent years, improvement in wavelength conversion efficiency, which indicates a ratio of the intensity of wavelength-converted light with respect to the intensity of incident light, has made it possible to perform optical amplification operation by the second-order nonlinear effect in the communication field. Optical amplifiers capable of such optical amplification operation can achieve amplification without degradation in signal-to-noise ratio of the input light by performing phase sensitive operation, and therefore these optical amplifiers are expected to be used for long-distance transmission applications in place of erbium doped fiber amplifiers.

In phase sensitive amplifiers capable of phase sensitive operation, two amplification operations are known. One amplification operation is an operation that utilizes a degenerate parametric amplification in which signal light and excitation light having a wavelength of half the wavelength of the signal light are input into a second-order nonlinear medium to amplify the signal light (see Non Patent Literature (NPL) 1). Another amplification operation is an operation that utilizes a non-degenerate parametric amplification in which a pair of signal light and idler light, and excitation light having a wavelength as a sum frequency of the signal light and the idler light are input so as to amplify the signal light and the idler light (see NPL 2). The paired signal light and idler light in this case are generated by the wavelength conversion mechanism that performs the above-described difference frequency generation.

In the field of communication, when a wavelength conversion technique using the second-order nonlinear optical effect is used, the difference frequency generation and the parametric amplification are mainly used in a mechanism having the second-order nonlinear effect. When amplification operation is simply called parametric amplification, it is assumed to indicate at least one of the degenerate parametric amplification or non-degenerate parametric amplification. In the difference frequency generation and the parametric amplification, the excitation light is light in then 0.78 μm band because the signal light and the idler light are present in a communication wavelength band in the 1.55 μm band. Although the required level of excitation light has been reduced due to recent improvements in wavelength conversion efficiency, but the excitation light in a range from several hundred mW to several W is still required.

FIG. 1 is a schematic diagram illustrating a partial cross section of a basic configuration of a wavelength conversion apparatus 100 according to a conventional technology when viewed from a top surface direction thereof. The wavelength conversion apparatus 100 receives signal light L1 in the 1.55 μm band from an optical fiber F1 in the 1.55 μm band connected to one side in a short-length direction thereof, and causes the light to be optically coupled to a wavelength conversion element 21 including a waveguide 21a for wavelength conversion with two lenses 11a and 11b. The optical coupling portion is the waveguide 21a of the wavelength conversion element 21. A second-order nonlinear optical element is used for the wavelength conversion element 21 in this case. The wavelength conversion apparatus 100 inputs excitation light L2 from an optical fiber F2 in the 0.78 μm band connected to one end portion in a direction perpendicular to the optical fiber F1 on one end side in a longitudinal direction, and causes the light to be optically coupled to the wavelength conversion element 21 with two lenses including a lens 11c and the lens 11d. In other words, the lens 11b is commonly used in the 1.55 μm and 0.78 μm bands on a side near the wavelength conversion element 21.

The wavelength conversion apparatus 100 further includes, between the lenses 11a and 11b, a dichroic mirror 12a configured to transmit light in the 1.55 μm band and reflect light in the 0.78 μm band in order to combine the light in the 1.55 μm band and the light in the 0.78 μm band. The wavelength-converted light in the 1.55 μm band output from an output end of the waveguide 21a of the wavelength conversion element 21 is optically connected to an optical fiber F4 in the 1.55 μm band connected to the other side in the short-length direction with two lenses 11d and 11e.

Signal light L4 having been amplified through the wavelength conversion operation is output from the optical fiber F4 in the 1.55 µm band.

In addition, in the wavelength conversion apparatus 100, another dichroic mirror 12b is provided between the lenses 11d and 11e in order to remove the light in the 0.78 µm band from the output light of the waveguide 21a. In the wavelength conversion apparatus 100, the wavelength-converted light in the 0.78 µm band output from the waveguide 21a is optically connected to an optical fiber F3 in the 0.78 µm band connected to the other end portion in a direction perpendicular to the optical fiber F4 on the other end side in the longitudinal direction with two lenses including the lens 11d and a lens 11f. The wavelength-converted light L3 having been amplified through the wavelength conversion operation in the wavelength conversion element 21 is output from the optical fiber F3 in the 0.78 µm band. However, if the dichroic mirror 12b can separate the light in the 0.78 µm band from the output light having been subjected to the wavelength conversion operation, it is not absolutely necessary to carry out the optical connection to the optical fiber F3. Among the constituent elements, the wavelength conversion element 21, the lenses 11a, 11b, 11c, 11d, 11e and 11f, and the dichroic mirrors 12a and 12b can be considered as optical elements.

In the wavelength conversion apparatus 100, a waveguide-type element made of lithium niobate having a polarization inversion structure, for example, may be used for the wavelength conversion element 21. When the wavelength conversion apparatus 100 is used as a phase sensitive amplifier, the input intensity of the excitation light L2 in the 0.78 µband in the range from several hundred mW to several W is required as described above. In contrast, at the stage when the signal light L1 is input to the wavelength conversion apparatus 100, the signal light L1 has been normally attenuated in the transmission line, and is input in a state of amplification operation being needed. Accordingly, the light intensity of the signal light L1 is −10 dBm or less per wavelength, which is a significantly small intensity level. In a case of multi-wavelength inputs such as a wavelength division multiplexing system, the light intensity is the sum of input lights for the number of wavelengths.

In the wavelength conversion apparatus 100, the excitation light L2 in the 0.78 µm band is required in the wavelength conversion element 21 for the wavelength conversion operation, but the excitation light L2 should not be output to the optical fiber F4 of the 1.55 µm band on the output side. This is because the light in the 0.78 µm band has high light energy, and when the light intensity thereof is also strong, there is a risk of deteriorating optical components used in the subsequent stage relative to the wavelength conversion apparatus 100. As the deterioration of the optical component, deterioration of adhesive of an optical connector or the like is known, for example. As such, on the output side of the wavelength conversion apparatus 100, it is required to block the wavelength-converted light L3 of the component of the excitation light L2 by the dichroic mirror 12b or the like as illustrated in FIG. 1. The wavelength conversion apparatus 100 employs a structure in which the wavelength-converted light L3 produced by carrying out wavelength conversion and amplification on the excitation light L2 in the output stage is guided to the optical fiber F3 in the 0.78 µm band so as to block the wavelength-converted light L3 for the optical fiber F4 in the 1.55 µm band.

However, in the wavelength conversion apparatus 100 illustrated in FIG. 1, it is confirmed that there still exists a risk of deterioration of optical components disposed in the subsequent stage, in addition to a problem of a decrease in wavelength conversion efficiency or phase sensitive amplification gain when light with large input power enters the apparatus. As described above, when parametric amplification or wavelength conversion are performed by introducing light with large input power, light in the 0.52 µm band, which is wavelength-converted light of the input light and conversion light, is generated in the wavelength conversion element 21. When the light in the 0.52 µm band is generated, the generated light is reflected by the wavelength conversion element 21 in the wavelength conversion apparatus 100 to return to the inside of the wavelength conversion element 21, or is mixed into the optical fiber F4 in the 1.55 µm band in the subsequent stage. In such a case, the problem of degrading amplification characteristics and conversion characteristics of the optical element at the location onto which the return light is radiated in the wavelength conversion apparatus 100, or deteriorating the optical component disposed on the output side of the wavelength conversion apparatus 100 can not be resolved.

In short, the existing wavelength conversion apparatus has a configuration where a situation in which unwanted light having a wavelength of the sum frequency component of the signal light L1 and the excitation light L2 returns to the wavelength conversion element cannot be suppressed, and the above-described unwanted light is easily mixed into the optical fiber on the output side.

CITATION LIST

Non Patent Literature

NPL 1: Takeshi Umeki, Osamu Tadanaga, Atsushi Takada, and Masaki Asobe "Phase sensitive degenerate parametric amplification using directly-bonded PPLN ridge waveguides," 28 Mar. 2011/Vol. 19, No. 7/OPTICS EXPRESS 6326-6332

NPL 2: T. Umeki, O. Tadanaga, M. Asobe, Y. Miyamoto, and H. Takenouchi "First demonstration of high-order QAM signal amplification in PPLN-based phase sensitive amplifier," 10 Feb. 2014/Vol. 22, No. 3/OPTICS EXPRESS 2473-2482

SUMMARY OF THE INVENTION

The present invention has been contrived to solve the above-described problems. An object of embodiments according to the present invention is to provide a wavelength conversion apparatus having a configuration where a situation in which unwanted light having a wavelength of a sum frequency component of signal light and excitation light returns to a wavelength conversion element can be suppressed, and the above-described unwanted light is unlikely to be mixed into an optical fiber on the output side.

To achieve the object described above, an aspect of the present invention is a wavelength conversion apparatus that includes at least any one of a second-order nonlinear optical element which receives excitation light and signal light input from optical fibers on an input side and performs phase sensitive amplification on the signal light, a second-order nonlinear optical element which receives excitation light and signal light input from optical fibers on an input side and performs difference frequency generation from the signal light, or a second-order nonlinear optical element which receives excitation light and a plurality of signal light input from optical fibers on an input side and performs sum frequency generation from the plurality of signal light. This wavelength conversion apparatus outputs, to an optical fiber on an output side, any one of the light having been subjected to the phase sensitive amplification that is output from the corresponding second-order nonlinear optical element, the light generated by the difference frequency generation that is output from the corresponding second-order nonlinear optical element, or the light generated by the sum frequency generation that is output from the corresponding second-order nonlinear optical element. This wavelength conversion apparatus further includes reflection suppressors on surfaces of optical elements excluding the second-order nonlinear optical element in the wavelength conversion apparatus between the optical fibers on the input side and the optical fiber on the output side, and on an end surface of the optical fiber on the output side, where the reflection suppressors are configured to suppress reflection by unwanted light generated in at least any one of a wavelength band in accordance with the excitation light and the signal light, a wavelength band in accordance with the difference frequency generation, or a wavelength band in accordance with the sum frequency generation, excluding the light having been subjected to the phase sensitive amplification, the light generated by the difference frequency generation, or the light generated by the sum frequency generation to be output to the optical fiber on the output side.

According to the configuration of the above-described an aspect, it is possible to suppress the return of unwanted light to the wavelength conversion element by the action of the reflection suppressors even when the sum frequency generation occurs in the wavelength conversion element, whereby the wavelength conversion characteristics are unlikely to be degraded, and the unwanted light is unlikely to be mixed into the optical fiber on the output side of the apparatus. This makes it possible to suppress the deterioration of the optical component disposed in the subsequent stage of the optical fiber on the output side of the apparatus. As a result, by applying the wavelength conversion apparatus according to the above-described aspect, the optical transmission line may be stably operated.

DESCRIPTION OF EMBODIMENTS

Figure 1:
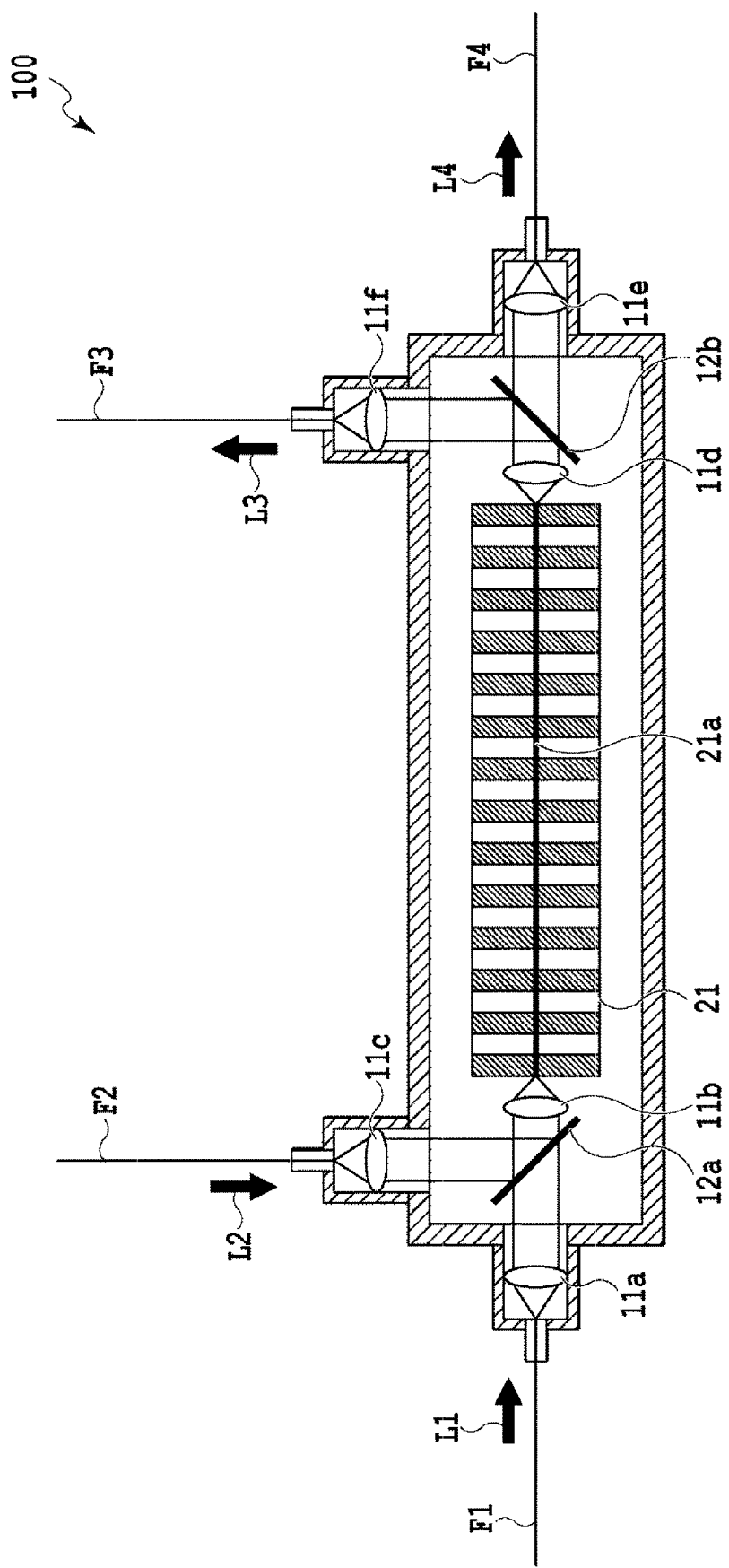
FIG. 1 is a schematic diagram illustrating a partial cross section of a basic configuration of a wavelength conversion apparatus according to a conventional technology when viewed from a top surface direction thereof.

Hereinafter, wavelength conversion apparatuses according to some embodiments of the present invention will be described in detail with reference to the drawings.

First, a technical approach having been carried out until the technical spirit of the present invention is reached will be describe below. The inventors of the present invention paid attention to phenomena such that conversion efficiency and amplification gain decrease, and optical components located in the subsequent stage deteriorate when the wavelength conversion apparatus 100 of the conventional technology described above with reference to FIG. 1 is used, and investigated reasons for the occurrence of the above phenomena. As a result, it was found that light with a wavelength near 0.52 μm remained in the wavelength conversion element 21, or the light with the wavelength near 0.52 μm was mixed into the optical fiber F4 where light in the 1.55 μm band propagated. Such unwanted light in the 0.52 μm band has a wavelength of two thirds of the excitation light L2.

Thus, when degenerate parametric amplification is performed, in a case where the wavelength of the signal light L1 is taken as $\lambda s$, the wavelength of the excitation light L2 becomes $\lambda s/2$, and unwanted light with a wavelength of $\lambda s/3$, which is a sum frequency component of the two wavelengths $\lambda s$ and $\lambda s/2$, is generated. Then, it was found that this unwanted light was emitted into the optical fiber F4, which propagetes light in the 1.55 μm band. Also, in the case of being used in the non-degenerate parametric amplification or normal difference frequency generation, due to the relationship between the excitation light L2, and the signal light L1 and idler light present in the 1.55 μm band, unwanted light is generated being centered at a wavelength of two thirds of the excitation light L2 accompanying the sum frequency generation. Similarly, using the second harmonic generation, which is one of the sum frequency generation processes of the input light, causes the generation of unwanted light accompanying the sum frequency generation of the input light and the second harmonic generation.

According to the analysis results described above, when parametric amplification, wavelength conversion, or the like is performed by causing light with large input power to enter the wavelength conversion apparatus 100, unwanted light in the 0.52 μm band, which is wavelength-converted light of the input light and conversion light, is generated in the wavelength conversion element 21. The generated unwanted light is reflected by the wavelength conversion element 21 in the wavelength conversion apparatus 100 to return to the inside of the wavelength conversion element 21, or is mixed into the optical fiber F4 in the 1.55 μm band in the subsequent stage. In such a case, the degradation in amplification characteristics, conversion characteristics, and the like of the optical element at the location onto which the return light inside the wavelength conversion apparatus 100 is radiated may be brought about, or the deterioration of the optical component disposed on the output side of the wavelength conversion apparatus 100 may be brought about.

Then, an object of a wavelength conversion apparatus according to each of the embodiments of the present invention is to provide a configuration where a situation in which unwanted light having a wavelength of a sum frequency component of the signal light L1 and the excitation light L2 returns to the wavelength conversion element 21 can be suppressed, and the above-described unwanted light is unlikely to be mixed into an optical fiber on the output side.

As a specific description of a wavelength conversion apparatus according to a preferred embodiment, a configuration may be exemplified in which a second-order nonlinear optical element has excitation light and signal light input from optical fibers on the input side and performs phase sensitive amplification on the input signal light. In addition a configuration of a second-order nonlinear optical element may be exemplified in which the excitation light and signal light are input from the optical fibers on the input side and difference frequency generation is achieved from the input signal light. Further, a configuration of a second-order nonlinear optical element may be exemplified in which the excitation light and a plurality of the signal light are input from the optical fibers on the input side and sum frequency generation is achieved from the plurality of the signal light. Then, the wavelength conversion apparatus is assumed to have a configuration in which any one of the light having been subjected to the phase sensitive amplification, the light generated by the difference frequency generation, or the signal light of the sum frequency light, to be output from any one of the above-described second-order nonlinear optical elements, can be output to the optical fiber on the output side.

Further, in this wavelength conversion apparatus, a reflection suppressor configured to suppress the reflection of light is provided on each of the surfaces of the optical elements excluding the second-order nonlinear optical element inside the apparatus between the optical fibers on the input side and the optical fibers on the output side, and on each of the end surfaces of the optical fibers on the output side. The reflection suppressors are preferably provided on all the surfaces of the optical elements other than the second-order nonlinear optical element inside the wavelength conversion apparatus. The light to be suppressed by the reflection suppressor is unwanted light excluding the light having been subjected to the phase sensitive amplification, the light generated by the difference frequency generation, or the light generated by the sum frequency generation to be output to the optical fibers on the output side. In other words, the reflection suppressor suppresses the reflection of unwanted light generated in any one of the wavelength band in accordance with the excitation light and signal light, the wavelength band in accordance with the difference frequency generation, or the wavelength band in accordance with the sum frequency generation.

According to the wavelength conversion apparatus with the above-described configuration, it is possible to suppress the return of the unwanted light to the wavelength conversion element by the action of the reflection suppressors even when the sum frequency generation occurs in the wavelength conversion element, whereby the wavelength conversion characteristics are unlikely to be degraded. In addition, because the unwanted light is unlikely to be mixed into the optical fiber on the output side of the wavelength conversion apparatus, the optical component disposed in the subsequent stage is also unlikely to be deteriorated. As a result, by applying this wavelength conversion apparatus, the optical transmission line may be stably operated.

It is preferable for the wavelength band of the signal light to include at least one of the O-band, E-band, S-band, C-band, or L-band available for use as a communication wavelength. The wavelength band of the signal light may correspond to any one of a wavelength band of ⅔ times the excitation light, a wavelength band of ⅔ times the light generated by the difference frequency generation, or a wavelength band of ⅔ times the light generated by the sum frequency generation. In other words, the light of the wavelength $\lambda s/3$ band that may deteriorate the characteristics of the wavelength conversion apparatus substantially corresponds to a wavelength of one third of the wavelength band used for optical communication, which is approximately three times in terms of the optical frequency. In this case, the light of the wavelength $\lambda s/3$ band corresponds to a wavelength band of one third of the signal light wavelength used in a communication wavelength including each of the bands described above. In the following, signal light of the C-band (1550 nm band), reflection of green light which is a third harmonic wave of the C-band signal light, a case of suppressing the mixing into the optical fiber on the output side, and the like will be described. Note that the wavelength conversion apparatus according to the present invention is not limited to the configuration of the C-band signal light, and may be applied to a configuration of signal light of another type of band.

It is sufficient for the material of the second-order nonlinear optical element to be any of $LiNbO_3$, $LiTaO_3$, and $LiNb(x)Ta(1-x)O_3$ (where $0 \leq x \leq 1$). In addition the material of the second-order nonlinear optical element may contain, as an additive, at least one of material selected from Mg, Zn, Sc, and In. In any case, it is preferable for the second-order nonlinear optical element to be a waveguide type and have a periodic polarization inversion structure.

In a wavelength conversion apparatus of each of the embodiments described below, a complicated and expensive temperature control technique considered in the conventional technology such that a large-size temperature control device is used, a temperature adjustment mechanism needs to be installed on the core side or the like, is not applied, and only a change in design of a well-known dielectric multilayer film is required. With such a simple method, it is possible to resolve the problems of a reduction in wavelength conversion efficiency, deterioration of the optical fibers, and the like due to unwanted light being indirectly generated accompanying the sum frequency generation. Hereinafter, wavelength conversion apparatuses according to respective embodiments will be specifically described.

First Embodiment

Figure 2:
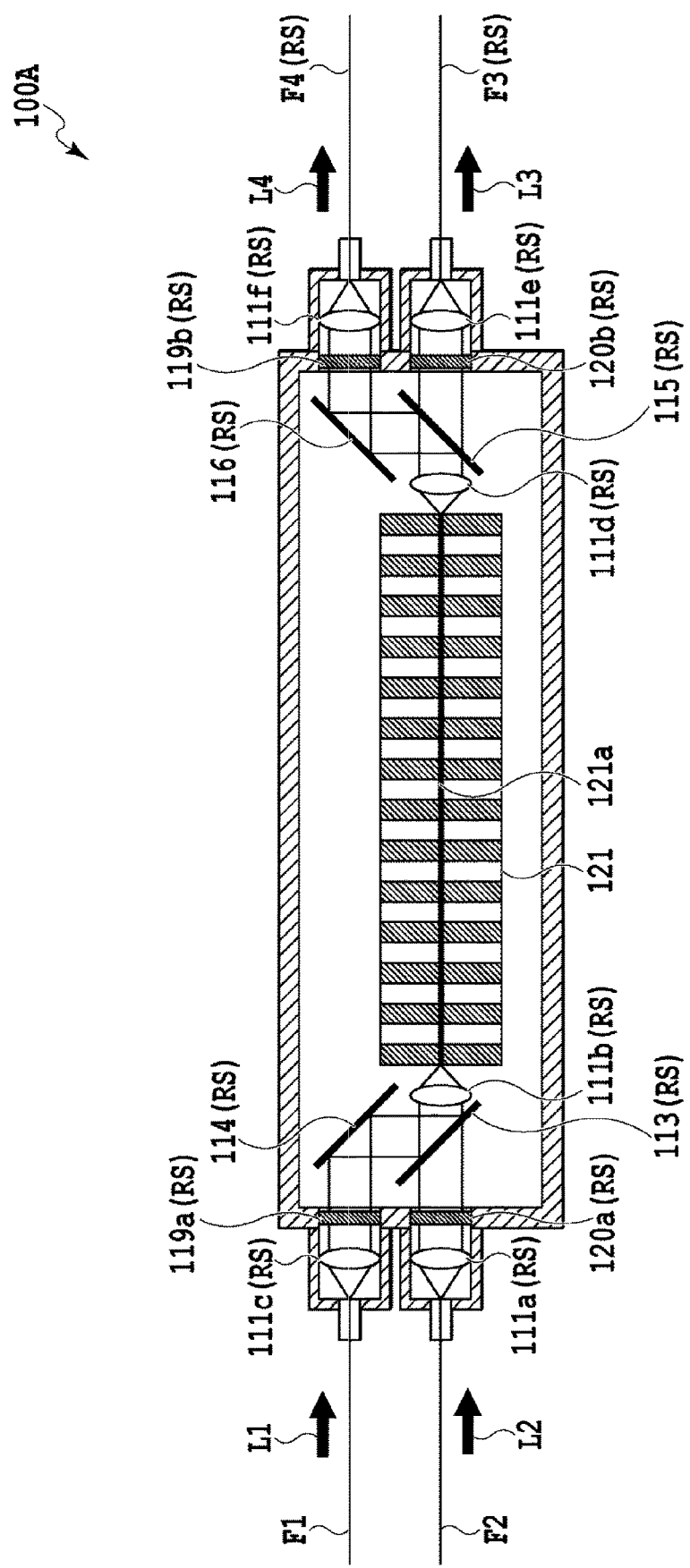
FIG. 2 is a schematic diagram illustrating a partial cross section of a basic configuration of a wavelength conversion apparatus according to a first embodiment of the present invention when viewed from a top surface direction thereof.

FIG. 2 is a schematic diagram illustrating a partial cross section of a basic configuration of a wavelength conversion apparatus 100A according to a first embodiment of the present invention when viewed from a top surface direction thereof.

Referring to FIG. 2, the wavelength conversion apparatus 100A corresponds to the case where second harmonic generation, one of the sum frequency generation, is used. In the wavelength conversion apparatus 100A, an optical fiber F1 in the 1.55 μm band and an optical fiber F2 in the 0.78 μm band are connected in parallel to one input side in a short-length direction. A dichroic mirror 114 is installed between the optical fiber F1 and a wavelength conversion element 121. In the wavelength conversion apparatus 100A, an optical fiber F4 in the 1.55 μm band and an optical fiber F3 in the 0.78 μm band are connected in parallel also to the other output side in the short-length direction. A dichroic mirror 116 is installed between the optical fiber F4 and the wavelength conversion element 121. In the wavelength conversion apparatus 100A, the dichroic mirror 113 is installed between the optical fiber F2 in the 0.78 μm band and the wavelength conversion element 121. A dichroic mirror 115 is installed between the optical fiber F3 in the 0.78 μm band and the wavelength conversion element 121. The wavelength conversion element 121 in this case also has a structure in which a waveguide 121a is included and a second-order nonlinear optical element is used.

In addition, in the wavelength conversion apparatus 100A, a lens 111c is installed between the optical fiber F1 configured to input signal light L1 and the dichroic mirror 114. A lens 111a is installed between the optical fiber F2 configured to input excitation light L2 and the dichroic mirror 113. Between the dichroic mirror 113 and the wavelength conversion element 121, a lens 111b is installed facing the lens 111a. Further, in the wavelength conversion apparatus 100A, a lens 111f is installed between the optical fiber F4 configured to output signal light L4 and the dichroic mirror 116. A lens 111e is installed between the optical fiber F3 configured to output wavelength-converted light L3 and the dichroic mirror 115. Further between the dichroic mirror 115 and the wavelength conversion element 121, a lens 111d is installed facing the lens 111e.

In addition, the wavelength conversion apparatus 100A is provided with a sealing window 119a between the dichroic mirror 114 on the input side of the wavelength conversion element 121 and the lens 111c to be optically coupled to the optical fiber F1. Similarly, there is provided a sealing window 119b between the dichroic mirror 116 on the output side of the wavelength conversion element 121 and the lens 111f to be optically coupled to the optical fiber F4. The wavelength conversion apparatus 100A is provided with a sealing window 120a between the dichroic mirror 113 on the input side of the wavelength conversion element 121 and the lens 111a to be optically coupled to the optical fiber F2. Similarly, there is provided a sealing window 120b between the dichroic mirror 115 on the output side of the wavelength conversion element 121 and the lens 111e to be optically coupled to the optical fiber F3. The sealing windows 119a and 119b are formed by materials that transmit the signal light L1 and L4 in the 1.55 μm band respectively, and the sealing windows 120a and 120b are formed by materials that transmit the excitation light L2 and the wavelength-converted light L3 in the 0.78 μm band respectively.

Among the constituent elements in the wavelength conversion apparatus 100A, the wavelength conversion element 121, the lenses 111a, 111b, 111c, 111d, 111e and 111f, the dichroic mirrors 113, 114, 115 and 116, and the sealing windows 119a, 119b, 120a and 120b can be considered as optical elements. In this wavelength conversion apparatus, in particular, among the constituent elements, non-reflective treatment is applied on the surfaces of the optical elements excluding the wavelength conversion element 121 inside the apparatus between the optical fibers F1, F2 on the input side and the optical fibers F3, F4 on the output side, and on the end surfaces of the optical fibers F3, F4 on the output side. In other words, the surfaces of the optical elements are the surfaces of the lenses 111a, 111b, 111c, 111d, 111e and 111f, the dichroic mirrors 113, 114, 115 and 116, and the sealing windows 119a, 119b, 120a and 120b.

The surfaces of the above-described optical elements and the end surfaces of the optical fibers F3, F4 are subjected to the non reflective treatment. The non reflective treatment indicates treatment to be non-reflective with respect to light having an optical frequency of three times the signal light L1, in addition to the signal light L1 and the light of the wavelength band of the wavelength-converted light of the excitation light L2 (wavelength-converted light L3). The non reflective treatment means providing a reflection suppressor (RS) in the embodiment. Note that in FIG. 2, in order to identify each of the constituent elements provided with the reflection suppressor (RS), a symbol indicating the reflection suppressor (RS) is added to the reference sign of each constituent element. When an anti-reflection coating having a multilayer structure is film-formed as the reflection suppressor (RS), the manufacturing is easily carried out.

In the wavelength conversion apparatus 100A having the above-described configuration, the signal light L1 in the 1.55 μm band is input from the optical fiber F1 in the 1.55 μm band connected to one side in the short-length direction via the lens 111c(RS) and the sealing window 119a(RS). The signal light L1 is reflected perpendicularly downward by the dichroic mirror 114(RS). The reflected light is reflected again perpendicularly rightward by the dichroic mirror 113 (RS), and is optically coupled to the wavelength conversion element 121 through the lens 111b(RS). The optical coupling portion is the waveguide 121a of the wavelength conversion element 121. In the wavelength conversion apparatus 100A, the excitation light L2 is input, through the lens 111a(RS) and the sealing window 120a(RS), from the optical fiber F2 in the 0.78 μm band connected to a different location from a location of the optical fiber F1 disposed in parallel and adjacent to the optical fiber F2 on the one side in the short-length direction. The excitation light L2 passes through the dichroic mirror 113(RS) and is optically coupled to the waveguide 121a of the wavelength conversion element 121 through the lens 111b(RS). In other words, in the wavelength conversion apparatus 100A, the lens 111b(RS) is also commonly used in the 1.55 μm and 0.78 μm bands on the side near the wavelength conversion element 121.

The wavelength-converted light in the 1.55 μm band that is output from the output end of the waveguide 121a of the wavelength conversion element 121 is reflected perpendicularly upward by the dichroic mirror 115(RS) through the lens 111d(RS). The reflected light is reflected again perpendicularly rightward by the dichroic mirror 116(RS), and is optically coupled, through the sealing window 119b(RS) and the lens 111f(RS), to the optical fiber F4(RS) in the 1.55 μm band connected on the other side in the short-length direction. Thus, the signal light L4 in the 1.55 μm band amplified by the wavelength conversion operation of the wavelength conversion element 121, is output to the optical fiber F4(RS). The wavelength-converted light in 0.78 μm band that is output from the output end of the waveguide 121a of the wavelength conversion element 121 passes through the dichroic mirror 115(RS) through the lens 111d(RS). The light having passed through the mirror is optically coupled, through the sealing window 120b(RS) and the lens 111e(RS), to the optical fiber F3(RS) in the 0.78 μm band connected to a different location from a location of the optical fiber F4(RS) disposed in parallel and adjacent to the optical fiber F3(RS) on the other side in the short-length direction. Thus, the wavelength-converted light L3 in the 0.78 μm band having experienced the wavelength conversion operation of the wavelength conversion element 121, is output to the optical fiber F3(RS).

In the wavelength conversion apparatus 100A, the reflection suppressor (RS) is provided on each of the surfaces of the optical elements excluding the wavelength conversion element 121 inside the apparatus between the optical fibers F1, F2 on the input side and the optical fibers F3(RS), F4(RS) on the output side. In addition, the reflection suppressor (RS) is also provided on each of the end surfaces of the optical fibers F3(RS) and F4(RS) on the output side. As a result, even when unwanted light in the 0.52 μm band is generated accompanying sum frequency generation at the time of wavelength conversion operation of the wavelength conversion element 121, the reflection of the unwanted light is suppressed by the reflection suppressor (RS), which makes it difficult for the unwanted light to return to the wavelength conversion element 121. In addition, by the action of the reflection suppressors (RSs), a situation in which the unwanted light is mixed into the optical fibers F3(RS) and F4(RS) can be suppressed.

Figure 3:
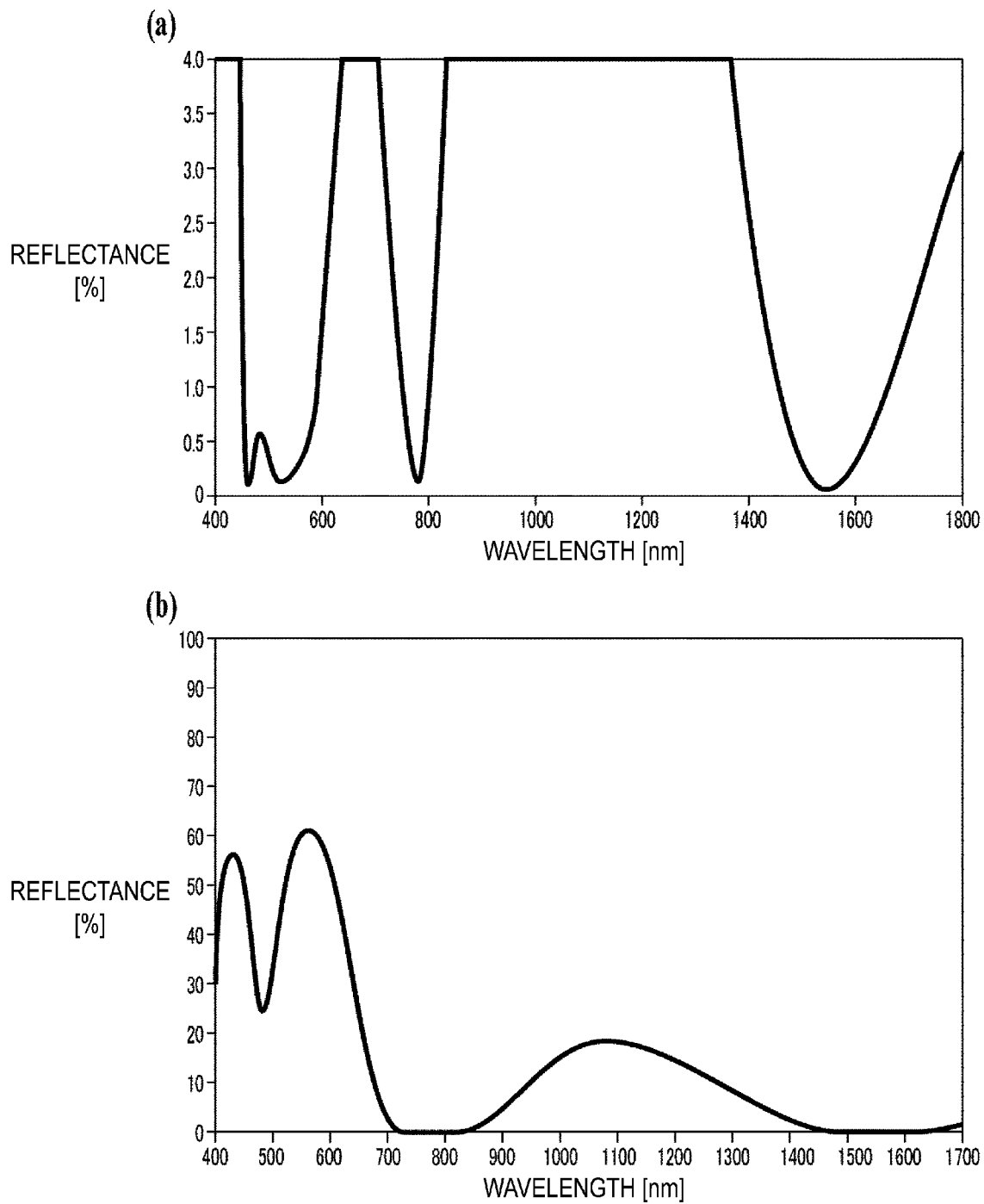
FIG. 3 depicts reflection-return-light suppression characteristics of wavelength conversion apparatus in terms of a relationship of reflectance to a wavelength. Note that FIG. 3($a$) is a graph associated with the reflection-return-light suppression characteristics of the wavelength conversion apparatus of the first embodiment illustrated in FIG. 2, and FIG. 3($b$) is a graph associated with the reflection-return-light suppression characteristics of the wavelength conversion apparatus of the conventional technology illustrated in FIG. 1.

FIG. 3 depicts reflection-return-light suppression characteristics of the wavelength conversion apparatuses 100 and 100A in terms of a relationship of reflectance [%] to a wavelength [nm]. FIG. 3(a) is a graph associated with the reflection-return-light suppression characteristics of the wavelength conversion apparatus 100A of the first embodiment illustrated in FIG. 2, and FIG. 3(b) is a graph associated with the reflection-return-light suppression characteristics of the wavelength conversion apparatus 100 of the conventional technology illustrated in FIG. 1.

Referring to FIG. 3(a) and FIG. 3(b), it is understood that, in the wavelength conversion apparatus 100A, by optimizing the design of the multilayer structure of the anti-reflection coating film-formed on each of the corresponding portions, the amount of reflection can be significantly reduced with respect to unwanted light having a frequency of three times the frequency of the signal light L1. In contrast, in the wavelength conversion apparatus 100, it is understood that, as the reflection-return-light suppression characteristics, the amount of reflection of unwanted light having a frequency of three times the frequency of the signal light L1 cannot be sufficiently reduced.

Next, an experiment of generating second harmonic light of the signal light L1 having a wavelength of 1.55 μm was carried out using the same wavelength conversion apparatuses 100, 100A.

Figure 4:
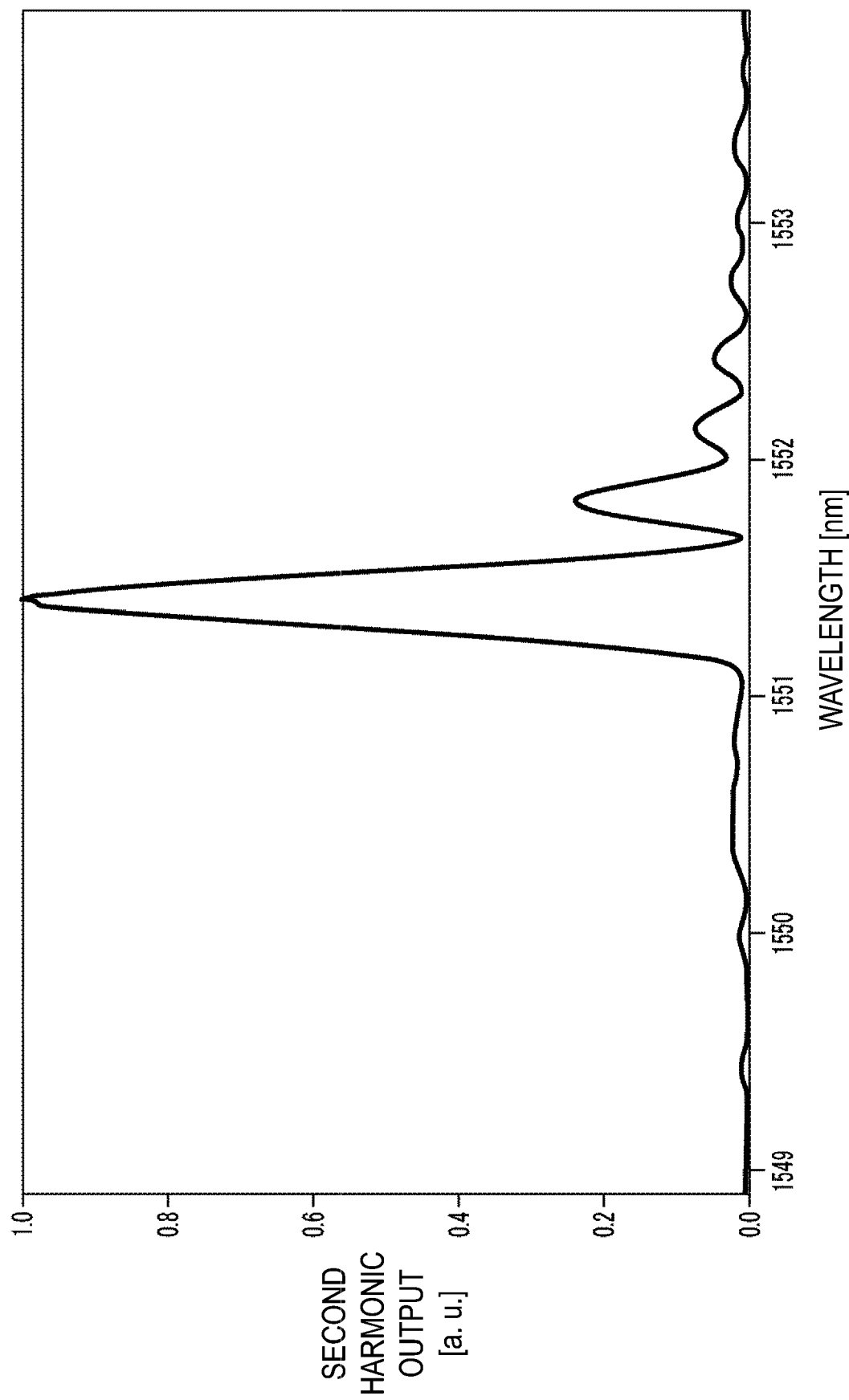
FIG. 4 depicts a phase matching curve of second harmonic generation at input power of 1 W of the wavelength conversion apparatus illustrated in FIG. 2 in terms of a relationship of second harmonic output to a wavelength.

FIG. 4 depicts a phase matching curve of second harmonic generation at input power of 1 W of the wavelength conversion apparatus 100A illustrated in FIG. 2 in terms of a relationship of second harmonic output [arbitrary unit (a. u.)] to a wavelength [nm].

Referring to FIG. 4, the state in which the wavelength-converted light L3 can be stably produced with high efficiency can be understood in the phase matching curve when the input power of the signal light L1 is set to be 1 W using the wavelength conversion apparatus 100A. The reason for this is assumed to be a residual component of 0.52 μm unwanted light in the wavelength conversion element 121 was reduced. This can be said to be an achievement brought by applying the anti reflection coating film (RS) to suppress the reflection of the light having a wavelength of 0.52 μm, which is three times the frequency of the wavelength of the signal light L1, on the surfaces of respective portions of the optical elements and on the end surfaces of the optical fibers F3(RS) and F4(RS) in the case of the wavelength conversion apparatus 100A. Further, in the conventional technology, the reduction in conversion efficiency needs to be prevented by providing, for example, a temperature control device for controlling temperature distribution inside the wavelength conversion element 21 for operation stabilization, but the wavelength conversion apparatus 100A does not need a temperature control device. That is, in the case of the wavelength conversion apparatus 100A, it has been confirmed that a stable and highly efficient wavelength conversion can be achieved without the temperature control device.

Figure 5:
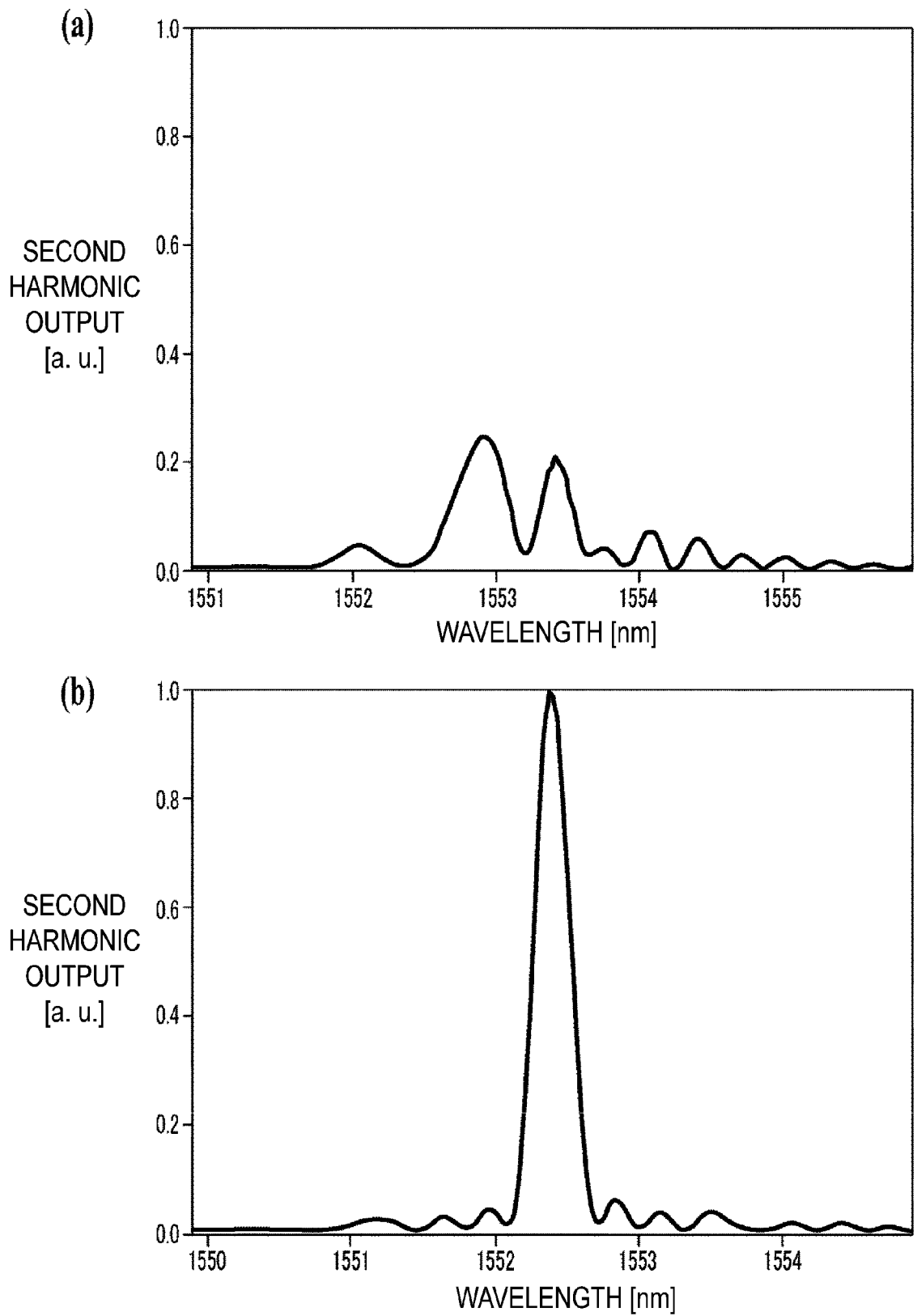
FIG. 5 depicts, as a comparison, a phase matching curves of second harmonic generation of the wavelength conversion apparatus illustrated in FIG. 1 in terms of a relationship of second harmonic output to a wavelength. Note that FIG. 5($a$) is associated with a phase matching curve of second harmonic generation at input power of 1 W, and FIG. 5($b$) is associated with a phase matching curve of second harmonic generation at input power of 3 W.

FIG. 5 depicts as a comparison, a phase matching curves of second harmonic generation of the wavelength conversion apparatus 100 illustrated in FIG. 1 in terms of a relationship of second harmonic output [a. u.] to a wavelength [nm]. FIG. 5(a) is associated with a phase matching curve of second harmonic generation at input power of 1 W, and FIG. 5(b) is associated with a phase matching curve of second harmonic generation at input power of 3 W.

Referring to FIG. 5(a), it is understood that the phase matching curve exhibits a SINC function, which is a theoretical shape, in the case where the input power of the signal light L1 is set to be 1 W, which is relatively lower power, by using the wavelength conversion apparatus 100. In contrast, referring to FIG. 5(b), the state in which the shape of the phase matching curve is deformed to bring about a decrease in the conversion efficiency is understood in the case where the input power of the signal light L1 is raised to be 3 W, which is relatively high power. The reason for this is considered to be that unwanted light of 0.52 μm is generated due to sum frequency generation of the signal light L1 and the second harmonic light in the wavelength conversion element 21, and the light of 0.52 μm is reflected on the surface of the optical element inside the apparatus to be mixed into the wavelength conversion element 21 again. In such a case, the wavelength conversion element 21 absorbs the light of 0.52 μm and generates heat so that a temperature distribution is generated inside the element to cause a change in the refractive index; then, the structure of the waveguide changes accompanying the refractive index change, which causes a decrease in the conversion efficiency.

As described above, in the wavelength conversion apparatus 100A of the first embodiment, the reflection suppressors (RSs) for restricting the reflection of the light (unwanted light) of three times of the frequency of the wavelength of the signal light L1 are provided on the surfaces of respective portions of the optical elements and on the end surfaces of the optical fibers F3(RS) and F4(RS). Because of this, it is possible to suppress the return of unwanted light to the wavelength conversion element 121 by the action of the reflection suppressors (RSs) even when the unwanted light is generated accompanying the sum frequency generation in the wavelength conversion element 121, whereby the wavelength conversion characteristics are unlikely to be degraded. In addition, because the unwanted light is unlikely to be mixed into the optical fiber F4(RS) on the output side of the apparatus, a situation in which the optical component disposed in the subsequent stage of the optical fiber F4(RS) on the output side of the apparatus is deteriorated is suppressed. As a result, by applying the wavelength conversion apparatus 100A, the optical transmission line can be stably operated.

Figure 6:
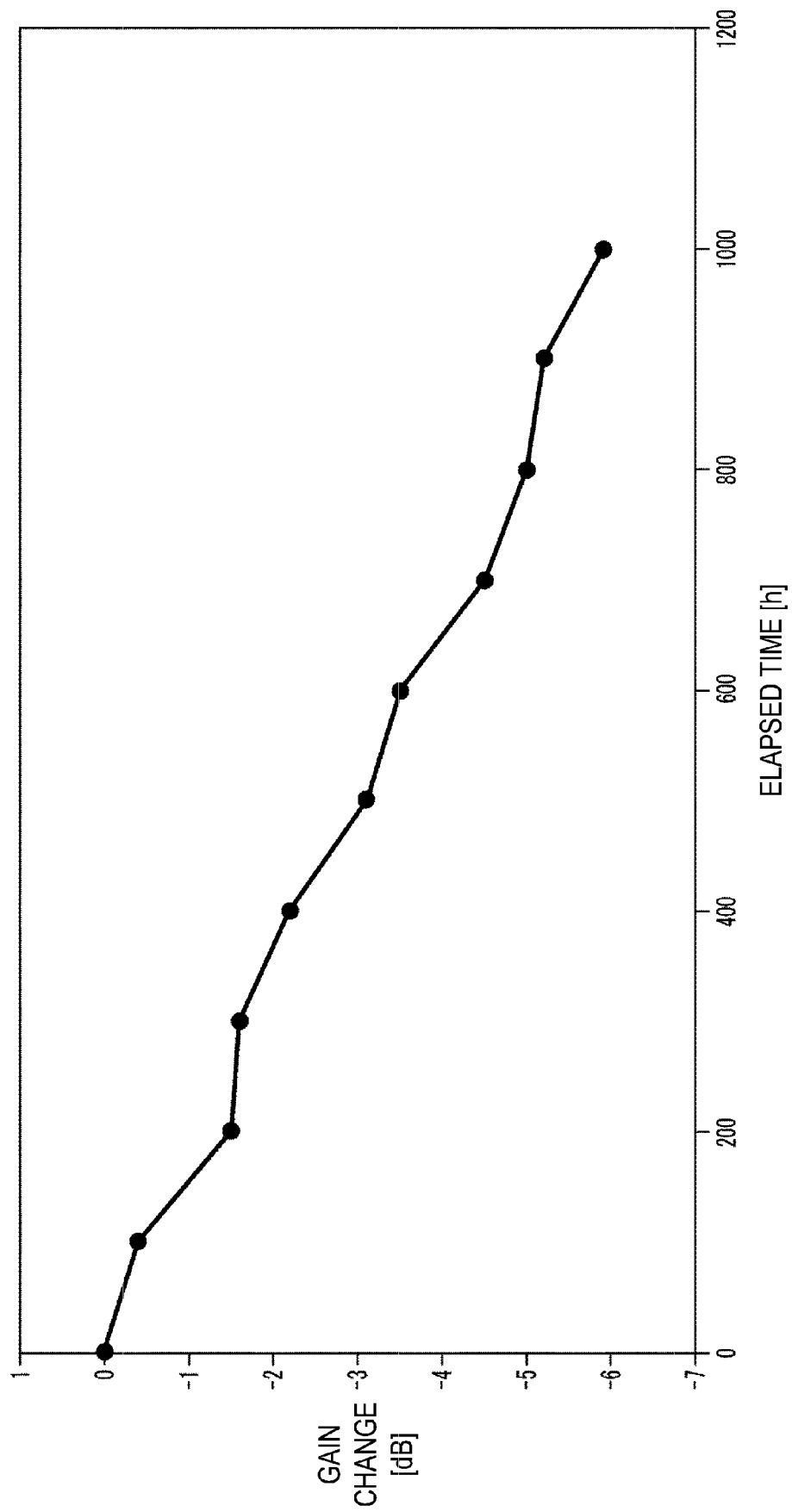
FIG. 6 depicts temporal gain characteristics obtained from a long-term test result of parametric amplification using the wavelength conversion apparatus illustrated in FIG. 2 in terms of a relationship of a gain change to elapsed time.

FIG. 6 depicts temporal gain characteristics obtained from a long-term test result of parametric amplification using the wavelength conversion apparatus 100A illustrated in FIG. 2 in terms of a relationship of a gain change [dB] to elapsed time [h].

With reference to FIG. 6, it has been found that the amplification gain decreases over time in the temporal gain characteristics when the wavelength conversion apparatus 100A performing parametric amplification is used for a long period of time. By a thorough research on the above phenomenon, it has been found that light of 0.52 μm generated in the wavelength conversion element 121 in the apparatus passed through the dichroic mirror 116(RS) to be optically coupled to the optical fiber F4(RS) in the 1.55 μm band on the output side. As a result, it has been found that an adhesive material in a connector of the optical fiber F4(RS) was deteriorated to cause axis misalignment. Countermeasures on this issue will be explained in a second embodiment described below.

Second Embodiment

Although not illustrated, a wavelength conversion apparatus 100B according to the second embodiment of the present invention corresponds to a case of using parametric amplification or phase sensitive amplification along with second harmonic generation. The wavelength conversion apparatus 100B is an improved apparatus that alleviate the problem of the decrease in amplification gain over time of the wavelength conversion apparatus 100A described above with reference to FIG. 6. The wavelength conversion apparatus 100B differs from the wavelength conversion apparatus 100A in a point that an optical thin film (O) for reflecting unwanted light is provided on a rear surface of the dichroic mirror 116(RS), and other constituent elements are the same as those of the wavelength conversion apparatus 100A.

Figure 7:
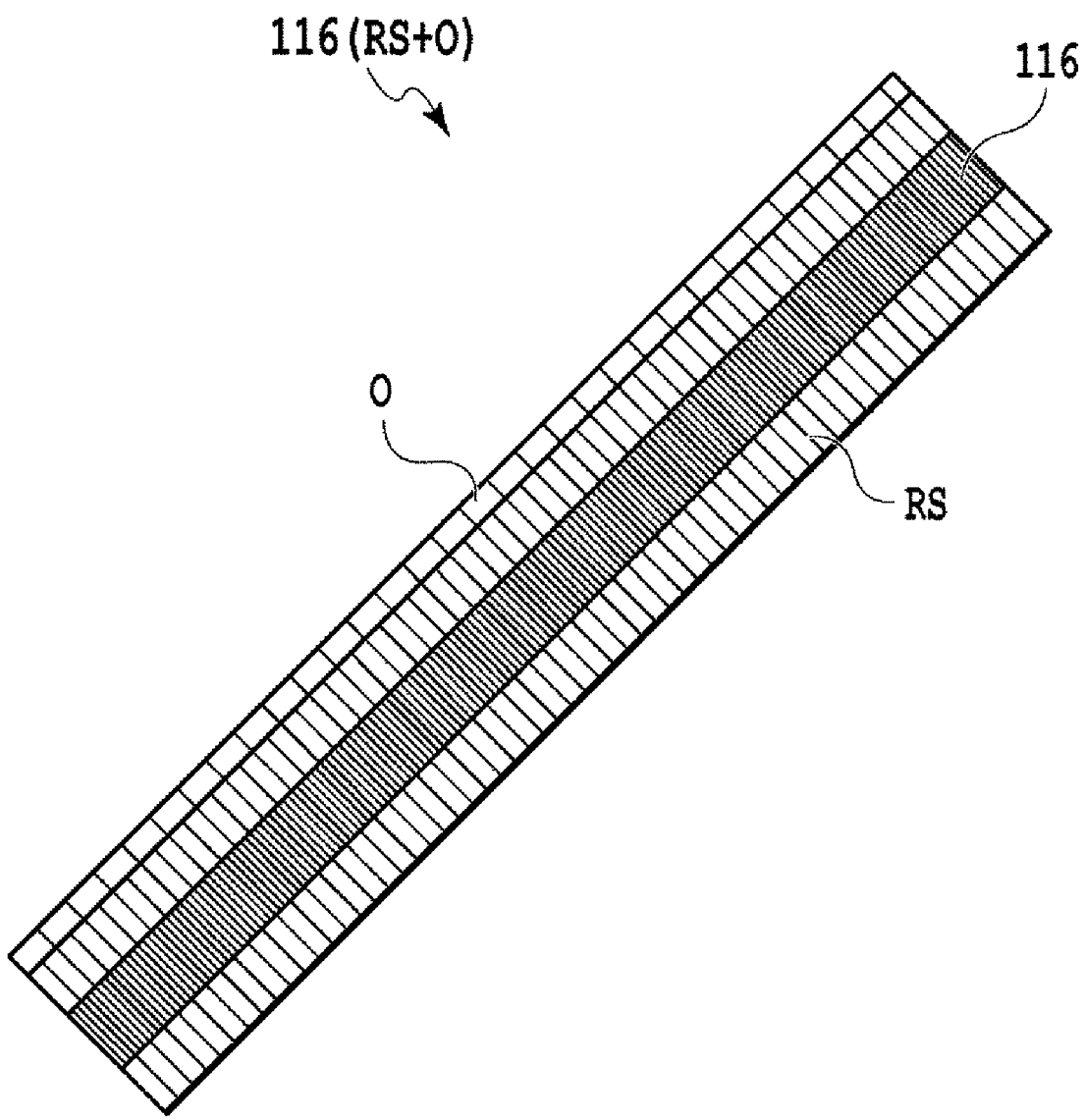
FIG. 7 is a diagram illustrating a side surface cross section in a longitudinal direction of a schematic configuration of a dichroic mirror, on the rear surface of which an optical thin film is provided, in a wavelength conversion apparatus according to a second embodiment of the present invention.

FIG. 7 is a diagram illustrating a side surface cross section in a longitudinal direction of a schematic configuration of the dichroic mirror 116(RS+O) which the optical thin film (O) is provided on the rear surface, in the wavelength conversion apparatus 100B according to the second embodiment.

Referring to FIG. 7, in the wavelength conversion apparatus 100B, the optical thin film (O) for reflecting the light (unwanted light) having a wavelength in the 0.52 μm band is provided on the rear surface of the dichroic mirror 116(RS). With this, the dichroic mirror 116(RS+O) including a reflection suppressor (RS) and the optical thin film (O) functions as a selective transmission-reflection unit that prevents optical coupling to the optical fiber F4(RS). The dichroic mirror 116(RS+O) is fabricated in the form as illustrated in FIG. 7, where the reflection suppressor (RS) is provided typically on the entire surface and the optical thin film (O) is provided on the rear surface, and then both ends of the side wall are cut. The surface of the dichroic mirror 116(RS+O) indicates a principal surface on a side facing the waveguide 121a of the wavelength conversion element 121, as in the cases of the other dichroic mirrors 113(RS), 114(RS), and 115(RS). The rear surface indicates a principal surface on the opposite side to the surface. The optical thin film (O) may be provided on the surface of the dichroic mirror 116(RS).

The selective transmission-reflection unit in this case separates the signal light L1 and the light generated by sum frequency generation, and the light having a wavelength of two thirds of the light generated by the sum frequency generation from one another. The selective transmission-reflection unit plays a role of preventing the optical coupling of the separated light having a wavelength of two thirds of the light generated by the sum frequency generation to the optical fiber F4(RS) on the output side. In accordance with the function of the wavelength conversion element 121, the selective transmission-reflection unit may also separate the excitation light L2 and the signal light L1, and the light having a wavelength of two thirds of the excitation light L2 from one another. It is also possible for the selective transmission-reflection unit to separate the light generated by difference frequency generation and the excitation light L2, and the light having a wavelength of two thirds of the excitation light L2 from one another. In any of the above cases, the selective transmission-reflection unit plays a role of preventing the separated light having the wavelength of two thirds of the excitation light L2 from being optically coupled to the optical fiber F4(RS) on the output side.

A 45-degree mirror, for example, may be used for the dichroic mirror 116(RS+O). In this case, at the rear surface (or may be the surface) of the 45-degree mirror, the optical thin film (O) reflects the signal light L1, light generated by the sum frequency generation, and light of a wavelength band of two thirds of the light generated by the sum frequency generation. In addition, in accordance with the function of the wavelength conversion element 121, the function of the optical thin film (O) may be changed to a function that reflects the excitation light L2, the signal light L1, and light in a wavelength band of two thirds of the excitation light L2 or light generated by the difference frequency generation, the excitation light L2, and the light of the wavelength band of two thirds of the excitation light L2. It is desirable in some cases that the optical thin film (O) be made to have a function of transmission instead of a function of reflection, and employed.

Furthermore, the optical thin film (O) configured to reflect the light generated by the sum frequency generation according to the wavelength conversion apparatus 100B may be considered to be included in a configuration in which two 45-degree mirrors as the selective transmission-reflection units are arranged in parallel to each other. In this case, the signal light L1 and the light generated by the difference frequency generation (where applicable) are reflected at the surface of the dichroic mirror (first 45-degree mirror) 115 (RS) disposed at a position optically close to the waveguide 121a of the wavelength conversion element 121. The excitation light L2, the light generated by the sum frequency generation, the light of a wavelength band of two thirds of the excitation light L2, and the light in a wavelength band of two thirds of the light generated by the sum frequency generation are allowed to pass through at the surface of the dichroic mirror 115(RS). At the rear surface of the dichroic mirror 115(RS), reflection by the signal light L1, the light generated by the difference frequency generation (where applicable), the excitation light L2, and the light generated by the sum frequency generation is prevented. Then, the light in the wavelength band of two thirds of the excitation light L2 and the light in the wavelength band of two thirds of the light generated by the sum frequency generation are reflected at the rear surface of the dichroic mirror 115(RS).

In contrast, the signal light L1 and the light generated by the difference frequency generation (where applicable) are reflected at the surface of the dichroic mirror (second 45-degree mirror) 116(RS+O) disposed at a position optically far from the waveguide 121a of the wavelength conversion element 121. The excitation light L2, the light generated by the sum frequency generation, the light in the wavelength band of two thirds of the excitation light L2, and the light in the wavelength band of two thirds of the light generated by the sum frequency generation are allowed to pass through at the surface of the dichroic mirror 116(RS+O). Furthermore, reflection by the light of all the wavelength bands is prevented at the rear surface of the dichroic mirror 116(RS+O).

Figure 8:
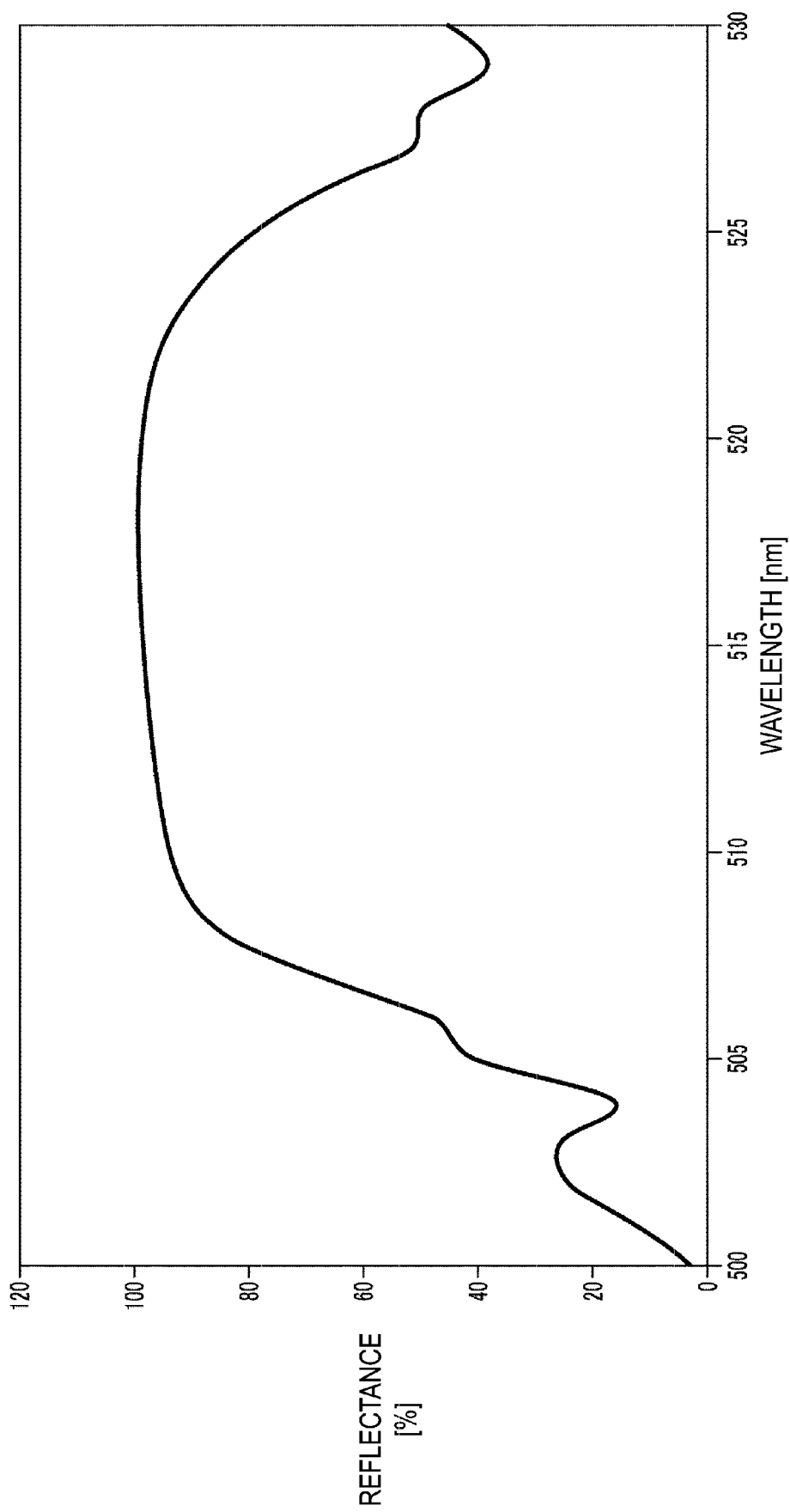
FIG. 8 depicts reflection characteristics brought by the optical thin film provided on the rear surface of the dichroic mirror illustrated in FIG. 7 in the wavelength conversion apparatus according to the second embodiment in terms of a relationship of reflectance to a wavelength.

FIG. 8 depicts reflection characteristics brought by the optical thin film (O) provided on the rear surface of the dichroic mirror 116(RS+O) according to the second embodiment in terms of a relationship of reflectance [%] to a wavelength [nm].

Referring to FIG. 8, the reflection characteristics brought by the optical thin film (O) in this case may suppress the transmission of light at the dichroic mirror 116(RS+O) by devising the structure of a dielectric multilayer film so as to reflect the light having a wavelength of two thirds of the light generated by the sum frequency generation in an amount of approximately 6% thereof. As a result, it has been confirmed that optical coupling to the optical fiber F4(RS) in the 1.55 μm band on the output side is significantly suppressed, and it has also been confirmed that an attenuation amount is suppressed to be within 1 dB as for amplification gain after a long-term test of 1000 hours as indicated in FIG. 6.

In the wavelength conversion apparatus 100B of the second embodiment, the optical thin film (O) for reflecting the unwanted light generated accompanying the sum frequency generation is provided on the rear surface of the dichroic mirror 116(RS+O). This makes it possible to prevent the unwanted light generated in the wavelength conversion element 121 from being optically coupled to the optical fiber F4(RS) on the output side. As a result, the wavelength conversion apparatus 100B is able to alleviate a problem of the wavelength conversion apparatus 100A that the amplification gain decreases over time, so that the wavelength conversion operation of the wavelength conversion apparatus 100B is stable even when it is used for a long period of time, and the reliability thereof is improved.

Figure 9:
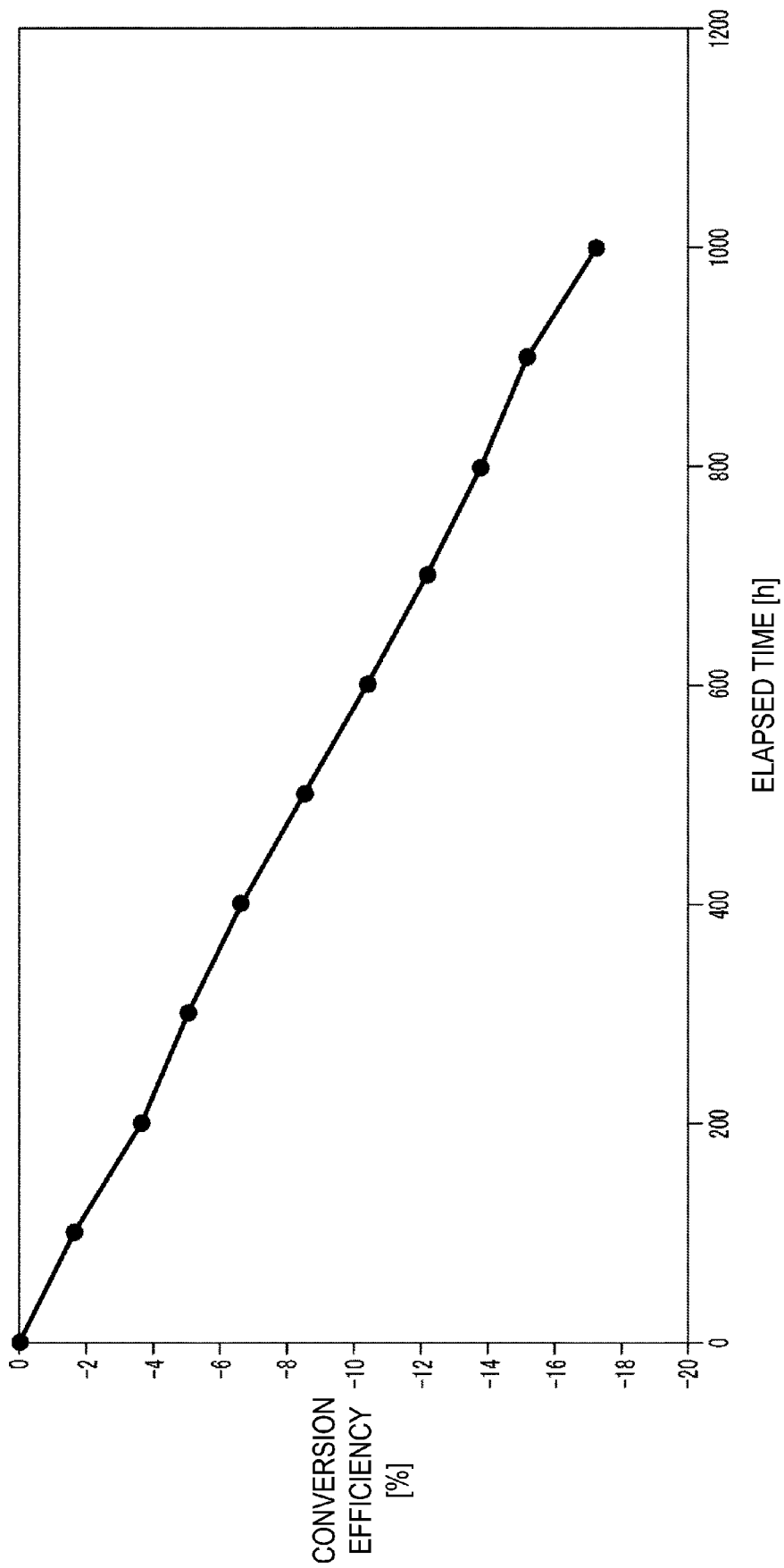
FIG. 9 illustrates long-term conversion characteristics at the time of second harmonic generation in the wavelength conversion apparatus according to the second embodiment in terms of a relationship of conversion efficiency to elapsed time.

FIG. 9 illustrates long-term conversion characteristics at the time of second harmonic generation in the wavelength conversion apparatus 100B according to the second embodiment in terms of a relationship of conversion efficiency [%] to elapsed time [h].

Referring to FIG. 9, in the long-term conversion characteristics at the time second harmonic generation in the wavelength conversion apparatus 100B, the state that the conversion efficiency is gradually reduced in proportion to the elapsed time is understood. By a thorough research on the above phenomenon, it has been found that light of 0.52 μm generated in the wavelength conversion element 121 in the apparatus is reflected at the rear surface of the dichroic mirror 115(RS) to be optically coupled to the optical fiber F3(RS) in the 0.78 μm band on the output side. As a result, it has been found that an adhesive material in a connector of the optical fiber F3(RS) was deteriorated to cause axis misalignment. Countermeasures on this issue will be explained in a third embodiment described below.

Third Embodiment

Although not illustrated, a wavelength conversion apparatus 100C according to the third embodiment of the present invention is a apparatus that corresponds to an aspect of a case used for second harmonic generation, and alleviates an issue of the wavelength conversion apparatus 100B described above with reference to FIG. 9 that the conversion efficiency is gradually reduced over time. The wavelength conversion apparatus 100C differs from the wavelength conversion apparatus 100A in a point that an optical thin film (O) for transmitting unwanted light is provided on the rear surface of the dichroic mirror 115(RS), and other constituent elements are the same as those of the wavelength conversion apparatus 100A.

Figure 10:
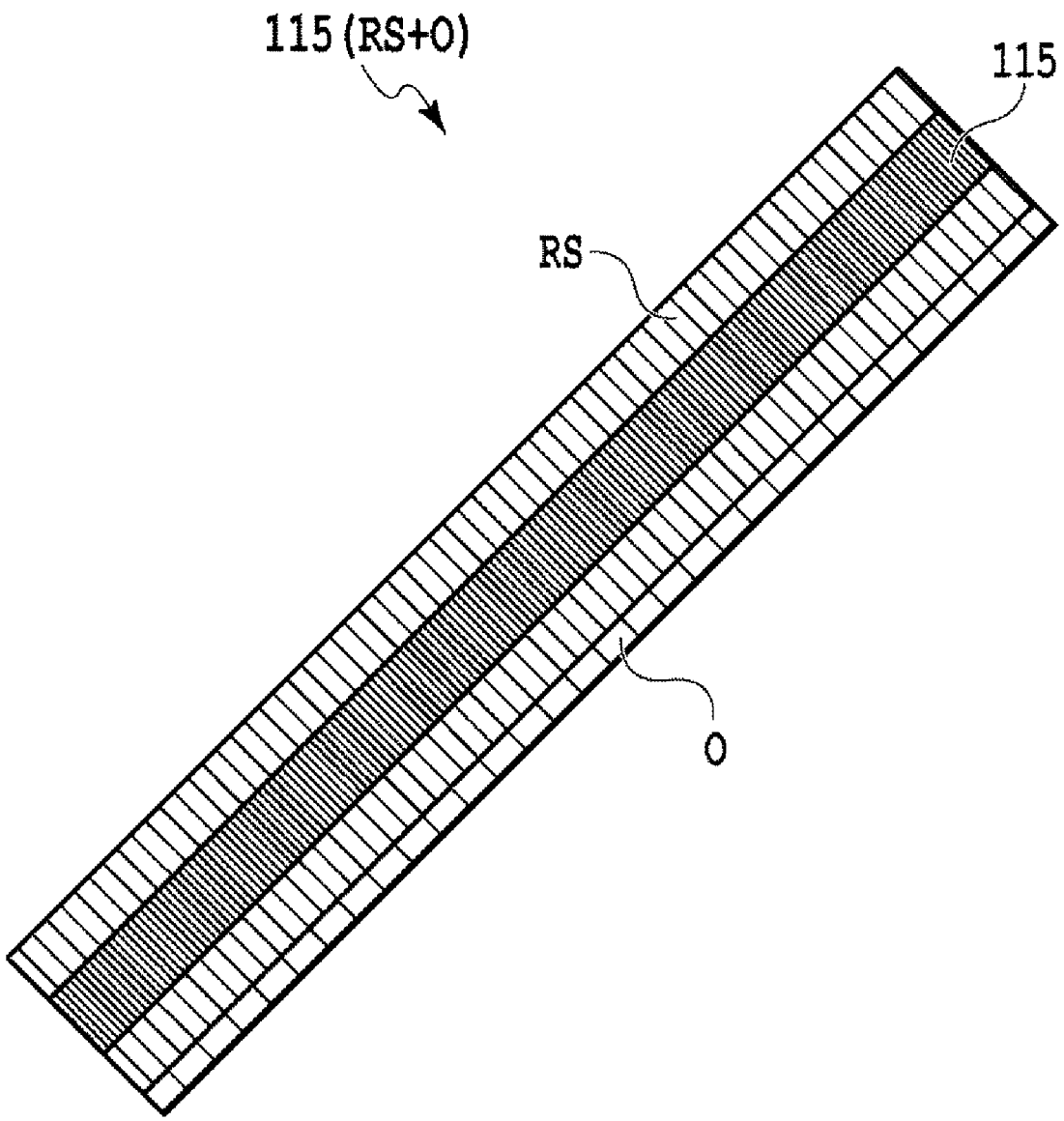
FIG. 10 is a diagram illustrating a side surface cross section in a longitudinal direction of a schematic configuration of a dichroic mirror, on the rear surface of which an optical thin film is provided, in a wavelength conversion apparatus according to a third embodiment of the present invention.

FIG. 10 is a diagram illustrating a side surface cross section in a longitudinal direction of a schematic configuration of the dichroic mirror 115(RS+O) which the optical thin film (O) is provided on the rear surface, in the wavelength conversion apparatus 100C according to the third embodiment.

Referring to FIG. 10, in the wavelength conversion apparatus 100C, the optical thin film (O) for transmitting the light (unwanted light) with a wavelength of the 0.52 μm band is further provided on the rear surface of the dichroic mirror 115(RS), in addition to the configuration of the wavelength conversion apparatus 100B. With this, the dichroic mirror 115(RS+O) including a reflection suppressor (RS) and the optical thin film (O) functions as a selective transmission-reflection unit that prevents optical coupling to the optical fiber F3(RS). The dichroic mirror 115(RS+O) is fabricated in the form as illustrated in FIG. 10, where the reflection suppressor (RS) is provided typically on the entire surface and the optical thin film (O) is provided on the rear surface, and then both ends of the side wall are cut. The surface of the dichroic mirror 115(RS+O) is a principal surface on the side facing the waveguide 121a of the wavelength conversion element 121 as described above. The optical thin film (O) may be provided on the surface of the dichroic mirror 115(RS).

The optical thin film (O) configured to transmit the unwanted light generated accompanying the sum frequency generation according to the wavelength conversion apparatus 100C may also be considered to be included in a configuration in which two 45-degree mirrors as the selective transmission-reflection units are arranged in parallel to each other. In this case as well, optical functions at the surfaces or rear surfaces of the dichroic mirror (first 45-degree mirror) 115(RS+O) and the dichroic mirror (second 45-degree mirror) 116(RS+O) are basically the same as those of the case described in the second embodiment.

In other words, the signal light L1 and the light generated by difference frequency generation (where applicable) are reflected at the surface of the dichroic mirror (first 45-degree mirror) 115(RS+O) disposed at a position optically close to the waveguide 121a of the wavelength conversion element 121. The excitation light L2, the light generated by sum frequency generation, the light in the wavelength band of two thirds of the excitation light L2, and the light of the wavelength band of two thirds of the light generated by the sum frequency generation are allowed to pass through at the surface of the dichroic mirror 115(RS+O). At the rear surface of the dichroic mirror 115(RS+O), reflection by the signal light L1, the light generated by the difference frequency generation (where applicable), the excitation light L2, and the light generated by the sum frequency generation is prevented. Then, the light in the wavelength band of two thirds of the excitation light L2 and the light in the wavelength band of two thirds of the light generated by the sum frequency generation are reflected at the rear surface of the dichroic mirror 115(RS+O).

In contrast, the signal light L1 and the light generated by the difference frequency generation (where applicable) are reflected at the surface of the dichroic mirror (second 45-degree mirror) 116(RS+O) disposed at a position optically far from the waveguide 121a of the wavelength conversion element 121. The excitation light L2, the light generated by the sum frequency generation, the light in the wavelength band of two thirds of the excitation light L2, and the light in the wavelength band of two thirds of the light generated by the sum frequency generation are allowed to pass through at the surface of the dichroic mirror 116(RS+O). Furthermore, reflection by the light of all the wavelength bands is prevented at the rear surface of the dichroic mirror 116(RS+O).

Figure 11:
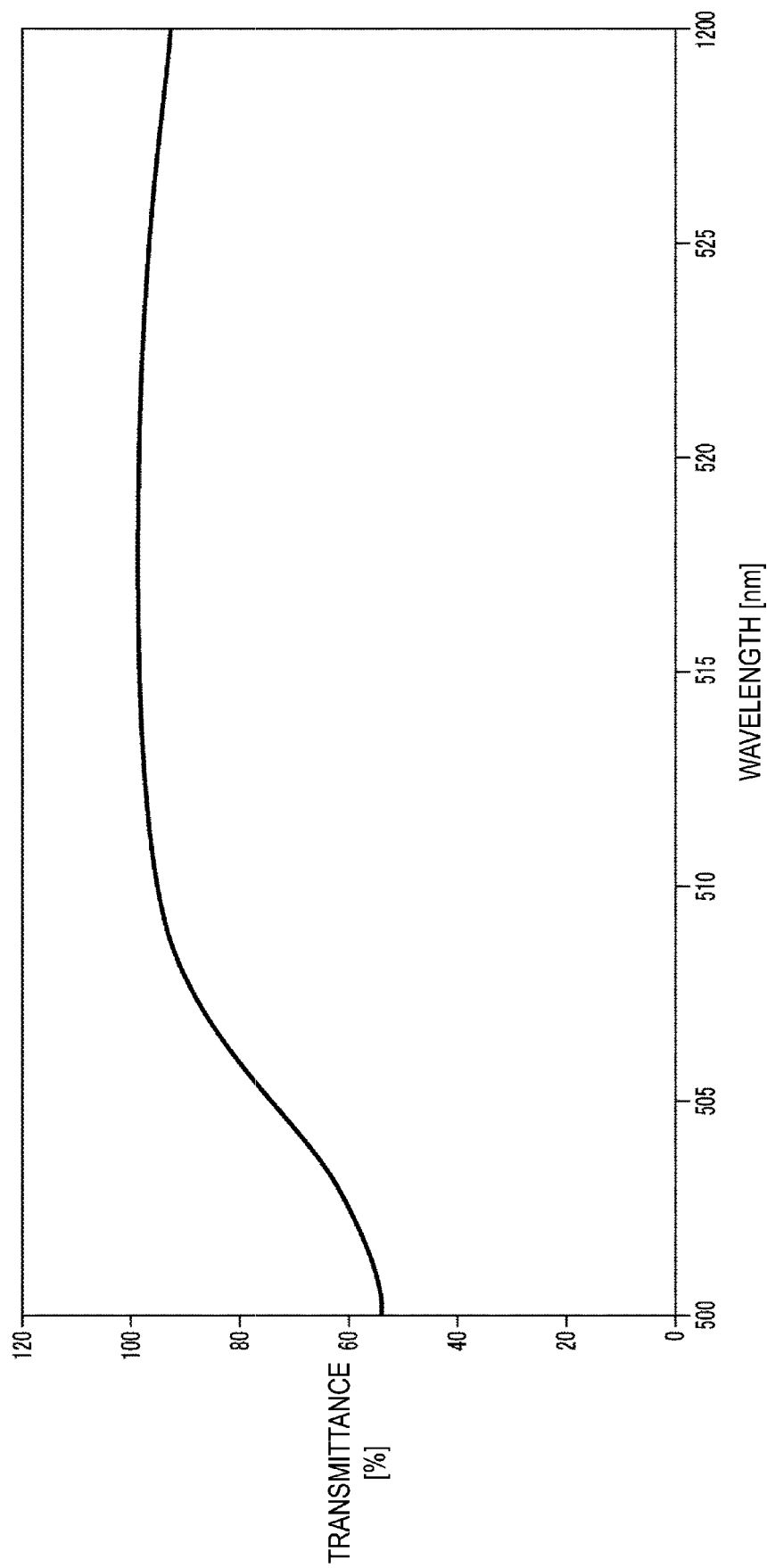
FIG. 11 depicts transmission characteristics brought by the optical thin film provided on the rear surface of the dichroic mirror illustrated in FIG. 10 in the wavelength conversion apparatus according to the third embodiment in terms of a relationship of transmittance to a wavelength.

FIG. 11 depicts transmission characteristics brought by the optical thin film (O) provided on the rear surface of the dichroic mirror 115(RS+O) in the wavelength conversion apparatus 100C according to the third embodiment in terms of a relationship of transmittance [%] to a wavelength [nm].

Referring to FIG. 11, the transmission characteristics brought by the optical thin film (O) in this case may suppress the reflection of light at the dichroic mirror 115(RS+0) by optimizing the design of the dielectric multilayer film so as to transmit the light having a wavelength of the 0.52 μm band in an amount of approximately 98% thereof. As a result, it has been confirmed that the optical coupling to the optical fiber F3(RS) in the 0.78 μm band on the output side is significantly suppressed, and that the amount of reduction is also suppressed to be within 3% as for the conversion efficiency after a long-term test of 1000 hours.

In the wavelength conversion apparatus 100C of the third embodiment, the optical thin film (O) for transmitting the unwanted light generated accompanying the sum frequency generation is provided on the rear surface of the dichroic mirror 115(RS+O) as well. This makes it possible to prevent the unwanted light generated in the wavelength conversion element 121 from being optically coupled to the optical fiber F3(RS) on the output side. As a result, the wavelength conversion apparatus 100C is able to alleviate a problem of the wavelength conversion apparatus 100B that the conversion efficiency decreases over time, so that the wavelength conversion operation of the wavelength conversion apparatus 100C is more stabilized even when it is used for a long period of time, and the reliability thereof is improved.

In the wavelength conversion apparatus 100B of the second embodiment and the wavelength conversion apparatus 100C of the third embodiment, long-term degradation in amplification gain and conversion efficiency can be suppressed. However, by detailed analysis on the behavior of the wavelength-converted light L3 and the unwanted light generated accompanying the second harmonic generation (sum frequency generation) during the long-term test, it was found that a fluctuation of about ±5% and a fluctuation of about ±7% in characteristics of the amplification gain and the conversion efficiency respectively were generated in each of the above-described light. By a thorough research on the above phenomena, the reason for the occurrence of the phenomena has been found as follows: the light in 0.52 μm band having been generated in the wavelength conversion element 121 and having passed through the dichroic mirrors 115(RS) and 115(RS+O) reflects irregularly at the inner wall of a housing of the apparatus. The inner wall of the housing of the apparatus is typically plated with metal. When such irregular reflection is repeated, the surface of the wavelength conversion element 121 is irradiated with the irregularly reflected light and an uneven temperature distribution is generated in the wavelength conversion element 121, so that temporal destabilization is expected to be brought about in the amplification gain and the conversion efficiency. Countermeasures against the above issue will be explained in a fourth embodiment described below.

Fourth Embodiment

Although not illustrated, a wavelength conversion apparatus 100D according to the fourth embodiment of the present invention is an improved wavelength conversion apparatus in a point that generation of irregular reflection that causes fluctuations in characteristics of amplification gain and conversion efficiency over time in the wavelength conversion apparatuses 100B and 100C may be suppressed. The wavelength conversion apparatus 100D differs from the wavelength conversion apparatus 100C in that a light absorber 123 for absorbing unwanted light is provided within the apparatus, and other constituent elements are the same as those of the wavelength conversion apparatus 100C.

Figure 12:
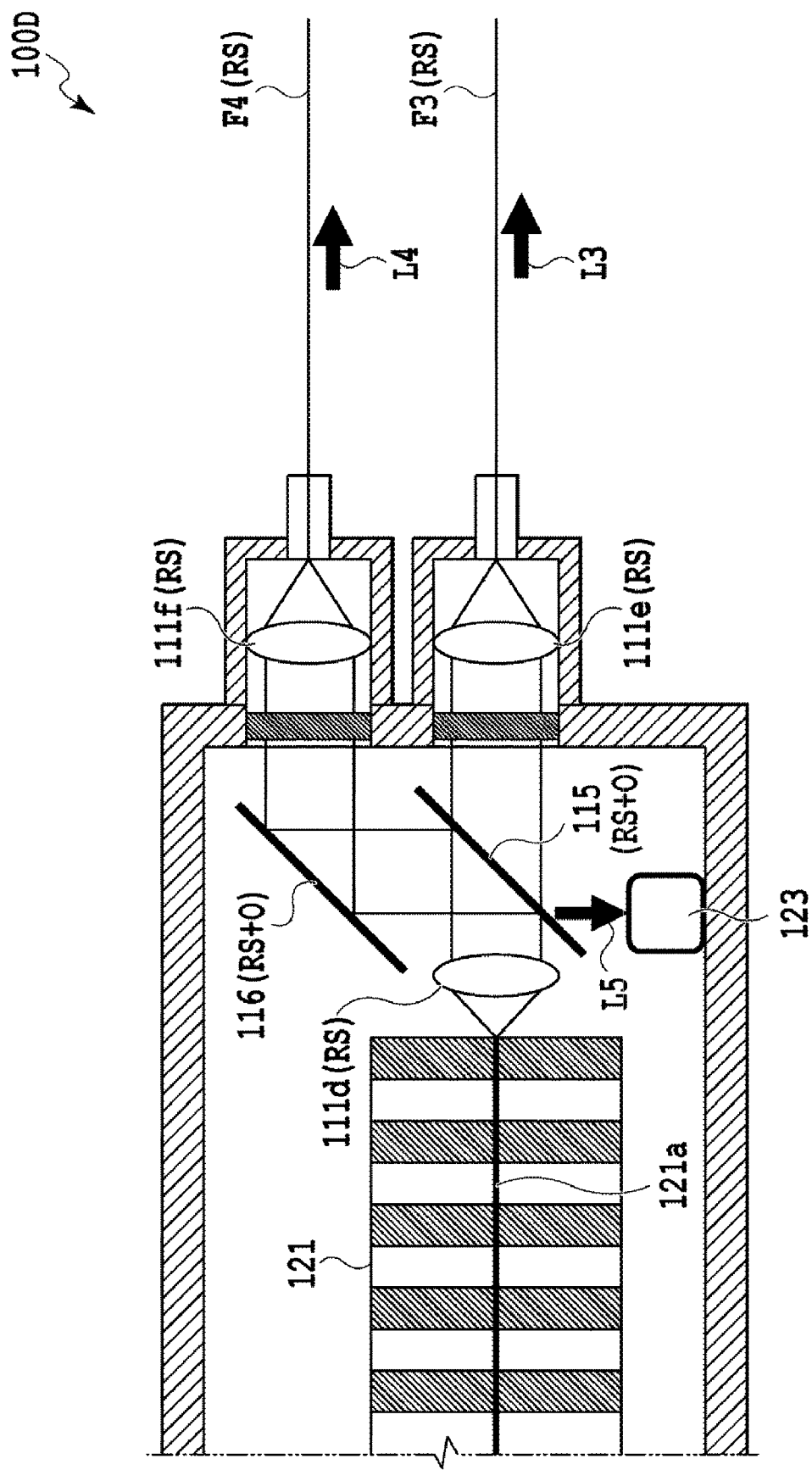
FIG. 12 is a schematic cross-sectional view, in which the cross section of part of a main section of a wavelength conversion apparatus according to a fourth embodiment of the present invention is depicted when seen from a top surface direction thereof.

FIG. 12 is a schematic cross-sectional view, in which the cross section of part of a main section of the wavelength conversion apparatus 100D according to the fourth embodiment of the present invention is depicted when seen from a top surface direction thereof.

Referring to FIG. 12, in the wavelength conversion apparatus 100D, in addition to the configuration of the wavelength conversion apparatus 100C, the light absorber 123 is provided on a reflection light path after the reflection light has passed through the dichroic mirror 115(RS+O) in order to resolve destabilization at the time of long-term use. The light absorber 123 serves as a light absorption unit that absorbs light L5, which is unwanted, having a wavelength of the 0.52 μm band.

In the wavelength conversion apparatus 100D of the fourth embodiment, because the light absorber 123 configured to absorb the light L5, which is unwanted, having the wavelength of the 0.52 μm band is provided inside the housing of the apparatus, irregular reflection of the light L5 having the wavelength of the 0.52 μm band is suppressed in the apparatus. As a result, it has been confirmed that both the amplification gain and conversion efficiency characteristics fall within a fluctuation of ±1%.

Similar effects to those described above may be obtained by configurations other than the configuration of the wavelength conversion apparatus 100D of the fourth embodiment; the description on this will be given in a fifth embodiment described below.

Fifth Embodiment

Although not illustrated, a wavelength conversion apparatus 100E according to the fifth embodiment of the present invention is an improved wavelength conversion apparatus in a point that generation of irregular reflection in the wavelength conversion apparatuses 100B and 100C may be similarly suppressed by employing a suppression scheme different from that of the wavelength conversion apparatus 100D. The wavelength conversion apparatus 100E differs from the wavelength conversion apparatus 100D in that, instead of the light absorber 123 for absorbing unwanted light, a light transmitting window 124 configured to transmit the unwanted light is provided in the apparatus, and other constituent elements are the same as those of the wavelength conversion apparatus 100D.

Figure 13:
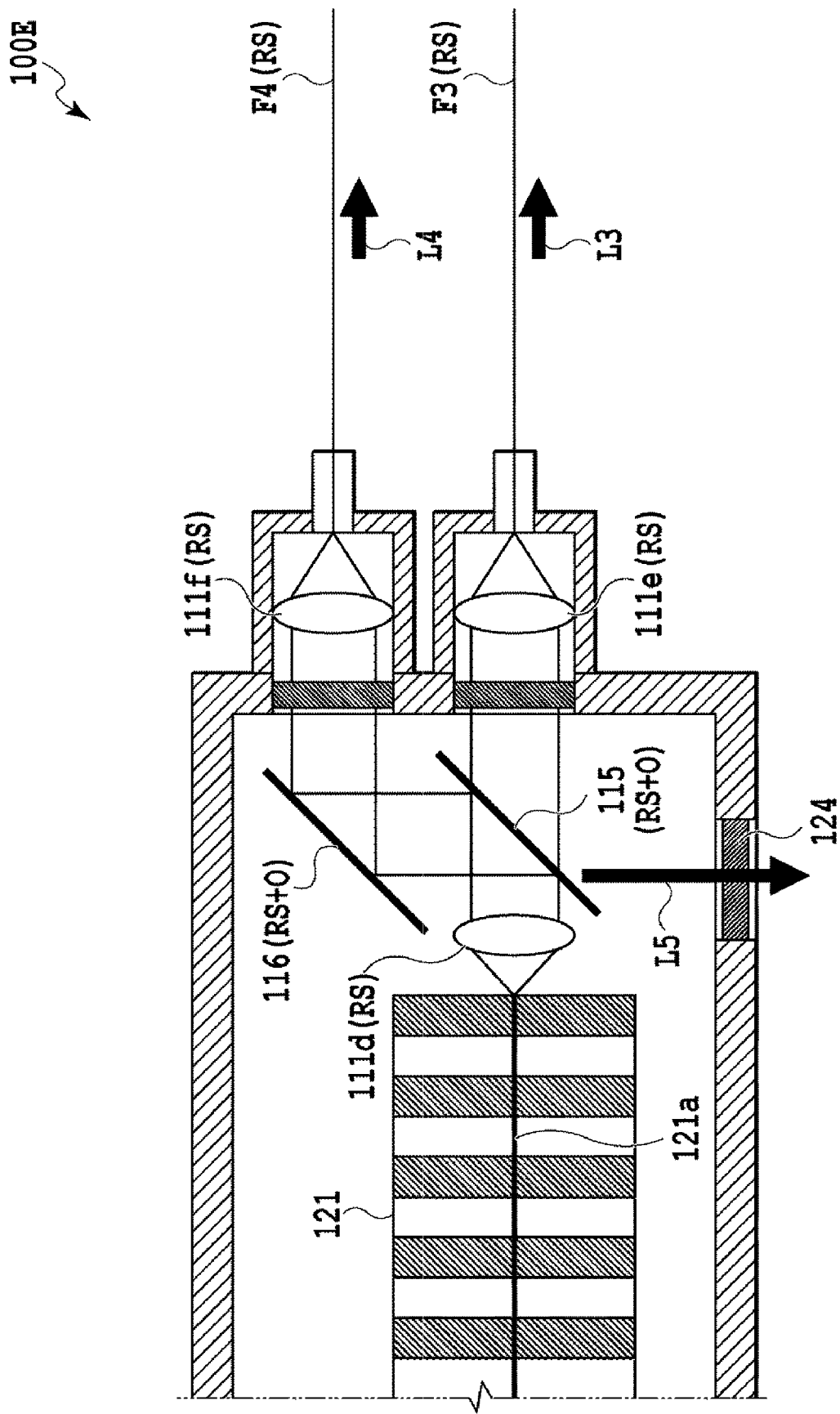
FIG. 13 is a schematic cross-sectional view, in which the cross section of part of a main section of a wavelength conversion apparatus according to a fifth embodiment of the present invention is depicted when seen from a top surface direction thereof.

FIG. 13 is a schematic cross-sectional view, in which the cross section of part of a main section of the wavelength conversion apparatus 100E according to the fifth embodiment of the present invention is depicted when seen from a top surface direction thereof.

Referring to FIG. 13, in the wavelength conversion apparatus 100E, in addition to the configuration of the wavelength conversion apparatus 100C, the light transmitting window 124 is provided on a reflection light path after the reflection light has passed through the dichroic mirror 115 (RS+O) for the same purpose as that in the fourth embodiment. The light transmitting window 124 is a window that is provided at a position near the output side of a side inner wall of the housing of the apparatus, and plays a role as a light transmitting unit configured to transmit light L5, which is unwanted, having a wavelength of 0.52 µm band to the outside of the apparatus.

In the wavelength conversion apparatus 100E of the fifth embodiment, because the light transmitting window 124 configured to transmit the light L5, which is unwanted, having the wavelength of the 0.52 µm band to the outside of the apparatus is provided inside the housing of the apparatus, irregular reflection of the light L5 having the wavelength of the 0.52 µm band is suppressed in the apparatus. As a result, it has been confirmed that both amplification gain and conversion efficiency characteristics fall within a fluctuation of ±1%. In particular, in the case of the wavelength conversion apparatus 100E of the fifth embodiment, because power of the light having the wavelength of the 0.52 µm band and output from the light transmitting window 124 can be monitored, there is an advantage that it is possible to grasp the characteristics of the wavelength conversion element 121 in use.

The wavelength conversion apparatuses 100A, 100B, 100C, 100D, and 100E described in the above embodiments may be used in general communication systems, and may be particularly suitable for use in optical communication devices.

The invention claimed is:

1. A wavelength conversion apparatus, including,
at least any one of a second-order nonlinear optical element configured to receive excitation light and signal light input from optical fibers on an input side and perform phase sensitive amplification on the signal light, a second-order nonlinear optical element configured to receive excitation light and signal light input from optical fibers on an input side and perform difference frequency generation from the signal light, or a second-order nonlinear optical element configured to receive excitation light and a plurality of signal light input from optical fibers on an input side and perform sum frequency generation from the plurality of signal light,
wherein the wavelength conversion apparatus outputs, to an optical fiber on an output side, any one of the light having been subjected to the phase sensitive amplification that is output from the corresponding second-order nonlinear optical element, the light generated by the difference frequency generation that is output from the corresponding second-order nonlinear optical element, or the light generated by the sum frequency generation that is output from the corresponding second-order nonlinear optical element,
the wavelength conversion apparatus comprising:
reflection suppressors on surfaces of optical elements excluding the second-order nonlinear optical element in the wavelength conversion apparatus between the optical fibers on the input side and the optical fiber on the output side, and on an end surface of the optical fiber on the output side, where the reflection suppressors are configured to suppress reflection by unwanted light generated in at least any one of a wavelength band in accordance with the excitation light and the signal light, a wavelength band in accordance with the difference frequency generation, or a wavelength band in accordance with the sum frequency generation, excluding the light having been subjected to the phase sensitive amplification, the light generated by the difference frequency generation, or the light generated by the sum frequency generation to be output to the optical fiber on the output side, and
a selective transmission-reflection unit that is provided between the second-order nonlinear optical element and the optical fiber on the output side, and that is configured to prevent optical coupling to the optical fiber on the output side,
wherein the selective transmission reflection unit is formed of a 45-degree mirror and includes an optical thin film, on a surface or a rear surface of the 45-degree mirror, that reflects or transmits any of a set of the excitation light, the signal light, and the light of a wavelength hand of two thirds of the excitation light, a set of the light generated by the difference frequency generation, the excitation light, and the light of the wavelength band of two thirds of the excitation light, and a set of the signal light, the light generated by the sum frequency generation, and the light of a wavelength band of two thirds of the light generated by the sum frequency generation,
wherein the selective transmission-reflection unit performs any one of separating the excitation light and the signal light, and light having a wavelength of two thirds of the excitation light from one another, separating the light generated by the difference frequency generation and the excitation light, and light having a wavelength of two thirds of the excitation light from one another, or separating the signal light and light generated by the sum frequency generation, and light having a wavelength of two thirds of the light generated by the sum frequency generation from one another, and prevents the separated light having the wavelength of two thirds of the excitation light or the separated light having the wavelength of two thirds of the light generated by the sum frequency generation from being optically coupled to the optical fiber on the output side.

2. The wavelength conversion apparatus according to claim 1,
wherein the wavelength band of the signal light includes at least one of the O-band, E-band, S-band, C-band, or L-band available for use as a communication wavelength, and corresponds to any one of a wavelength band of ⅔ times the excitation light, a wavelength band of ⅔ times the light generated by the difference frequency generation, or a wavelength band of ⅔ times the light generated by the sum frequency generation.

3. The wavelength conversion apparatus according to claim 1,
wherein the second-order nonlinear optical element is formed of any of materials of $LiNbO_3$, $LiTaO_3$, and $LiNb(x)Ta(1-x)O_3$ (where $0 \leq x \leq 1$), or a material containing at least one of material selected from the group consisting of Mg, Zn, Sc, and In as an additive in any of the materials.

4. The wavelength conversion apparatus according to claim 1,
wherein the second-order nonlinear optical element is a waveguide type and has a periodic polarization inversion structure.

5. A wavelength conversion apparatus, including,
at least any one of a second-order nonlinear optical element configured to receive excitation light and signal light input from optical fibers on an input side and perform phase sensitive amplification on the signal light, a second-order nonlinear optical element configured to receive excitation light and signal light input from optical fibers on an input side and perform difference frequency generation from the signal light, or a second-order nonlinear optical element configured to receive excitation light and a plurality of signal light input front optical fibers on an input side and perform sum frequency generation from the plurality of signal light,
wherein the wavelength conversion apparatus outputs, to an optical fiber on an output side, any one of the light having been subjected to the phase sensitive amplification that is output from the corresponding second-order nonlinear optical element, the light generated by the difference frequency generation that is output from the corresponding second-order nonlinear optical element, or the light generated by the stun frequency generation that is output from the corresponding second-order nonlinear optical element,
the wavelength conversion apparatus comprising:
reflection suppressors on surfaces of optical elements excluding the second-order nonlinear optical element in the wavelength conversion apparatus between the optical fibers on the input side and the optical fiber on the output side, and on an end surface of the optical fiber on the output side, where the reflection suppressors are configured to suppress reflection by unwanted light generated in at least any one of a wavelength band in accordance with the excitation light and the signal light, a wavelength band in accordance with the difference frequency generation, or a wavelength band in accordance with the sum frequency generation, excluding the light having been subjected to the phase sensitive amplification, the light generated by the difference frequency generation, or the light generated by the sum frequency generation to be output the optical fiber on the output side, and a selective transmission-reflection unit that is provided between the second-order nonlinear optical element and the optical fiber on the output side, and that is configured to prevent optical coupling to the optical fiber on the output side,
wherein the selective transmission-reflection unit is formed of two 45-degree mirrors arranged in parallel to each other,
of the two 45-degree mirrors, at a surface of a first 45-degree mirror disposed at a position optically close to the second-order nonlinear optical element, the signal light and the light generated by the difference frequency generation are reflected, and the excitation light, the light generated by the sum frequency generation, the light of the wavelength band of two thirds of the excitation light and the light of the wavelength band of two thirds of the light generated by the sum frequency generation are transmitted, and at a rear surface of the first 45-degree mirror, reflection by the signal light, the light generated by the difference frequency generation, the excitation light and the light generated by the sum frequency generation is prevented, and the light of the wavelength band of two thirds of the excitation light and the light of the wavelength band of two thirds of the light generated by the sum frequency generation are reflected, and
of the two 45-degree mirrors, at a surface of a second 45-degree mirror disposed at a position optically far from the second-order nonlinear optical element, the signal light and the light generated by the difference frequency generation are reflected, and the excitation light, the light generated by the sum frequency generation, the light of the wavelength band of two thirds of the excitation light and the light of the wavelength band of two thirds of the light generated by the sum frequency generation are transmitted, and at a rear surface of the second 45-degree mirror, reflection by the light of all the wavelength bands is prevented,
wherein the selective transmission-reflection unit performs any one of separating the excitation light and the signal light, and light having a wavelength of two thirds of the excitation light from one another, separating the light generated by the difference frequency generation and the excitation light, and light having a wavelength of two thirds of the excitation light from one another, or separating the signal light and light generated by the sum frequency generation, and light having a wavelength of two thirds of the light generated by the sum frequency generation from one another, and prevents the separated light having the wavelength of two thirds of the excitation light or the separated light having the wavelength of two thirds of the light generated by the sum frequency generation from being optically coupled to the optical fiber on the output side.

6. The wavelength conversion apparatus according to claim 5, further comprising:
any of a light absorber configured to absorb the separated light having a wavelength of two thirds of the excitation light or the separated light of a wavelength band of two thirds of the light generated by the sum frequency generation, and a light transmitting unit configured to transmit, to the outside of the wavelength conversion apparatus, the separated light having the wavelength of two thirds of the excitation light or the separated light of the wavelength band of two thirds of the light generated by the sum frequency generation.

* * * * *